United States Patent
Kusunoki et al.

(10) Patent No.: US 7,385,355 B2
(45) Date of Patent: *Jun. 10, 2008

(54) DISPLAY DEVICE HAVING A THIN FILM ELECTRON SOURCE ARRAY

(75) Inventors: Toshiaki Kusunoki, Tokorozawa (JP); Masakazu Sagawa, Inagi (JP); Mutsumi Suzuki, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 4 days.

This patent is subject to a terminal disclaimer.

(21) Appl. No.: 11/501,745

(22) Filed: Aug. 10, 2006

(65) Prior Publication Data

US 2006/0267480 A1    Nov. 30, 2006

Related U.S. Application Data

(63) Continuation of application No. 10/724,149, filed on Dec. 1, 2003, now Pat. No. 7,129,641.

(30) Foreign Application Priority Data

| Dec. 26, 2002 | (JP) | ............................ 2002-375855 |
| May 14, 2003 | (JP) | ............................ 2003-135267 |
| May 14, 2003 | (JP) | ............................ 2003-135268 |
| May 14, 2003 | (JP) | ............................ 2003-135269 |
| Oct. 14, 2003 | (JP) | ............................ 2003-354161 |

(51) Int. Cl.
    *G09G 3/10* (2006.01)

(52) U.S. Cl. .................. 315/169.1; 315/169.3; 315/169.4; 345/75.2; 345/80; 345/905; 313/306; 313/310

(58) Field of Classification Search ............ 315/169.1, 315/169.4; 313/495–497, 503, 505, 506, 313/509, 309–311, 306; 445/24, 46, 49–51; 257/748–752, 761–767, 10; 345/74.1–75.2, 345/80, 905

See application file for complete search history.

(56) References Cited

U.S. PATENT DOCUMENTS 5,699,135 A * 12/1997 Hisatake et al. ............ 349/113

(Continued)

FOREIGN PATENT DOCUMENTS

JP        07-065710        8/1993

(Continued)

OTHER PUBLICATIONS

Yokoo, Kuniyoshi, et al., "Emission characteristics of metal-oxide-semiconductor electron tunneling cathode", J. Vac. Sci. Technol. B 11(2), American Vacuum Society, Mar./Apr. 1993 pp. 429-432.

(Continued)

*Primary Examiner*—Haissa Philogene
(74) *Attorney, Agent, or Firm*—Reed Smith LLP; Stanley P. Fisher, Esq.; Juan Carlos A. Marquez, Esq.

(57) ABSTRACT

The invention provides a display device using thin film type electron sources having a structure that can be formed in a simple manufacturing process. A lower electrode, a protective insulating layer and an interlayer film are formed on a cathode substrate. An upper bus electrode made from a laminated film of a metal film lower layer and a metal film upper layer is provided further on the interlayer film. A film of an upper electrode of a thin film type electron source for each pixel constituted by an insulating layer serving as an electron accelerating layer on the lower electrode and the upper electrode is formed on two stripe electrodes of the upper bus electrode in that pixel and another upper bus electrode in an adjacent pixel by sputtering. Then, the upper electrode is separated by self-alignment due to a setback portion of the metal film lower layer and an appentice of the metal film upper layer of the corresponding upper bus electrode. Thus, a thin film type electron source separated in accordance with each pixel is formed.

7 Claims, 30 Drawing Sheets

U.S. PATENT DOCUMENTS

| | | | |
|---|---|---|---|
| 5,702,281 A * | 12/1997 | Huang et al. | 445/50 |
| 5,936,257 A * | 8/1999 | Kusunoki et al. | 257/10 |
| 5,939,828 A * | 8/1999 | Matsuzaki et al. | 313/584 |
| 5,962,959 A * | 10/1999 | Iwasaki et al. | 313/310 |
| 5,990,605 A * | 11/1999 | Yoshikawa et al. | 313/310 |
| 6,104,136 A | 8/2000 | Abe et al. | 313/495 |
| 6,153,973 A | 11/2000 | Shibata et al. | 313/495 |
| 6,316,873 B1 * | 11/2001 | Ito et al. | 313/496 |
| 6,614,169 B2 * | 9/2003 | Kusunoki et al. | 313/496 |
| 6,617,774 B1 * | 9/2003 | Kusunoki et al. | 313/311 |
| 6,963,171 B2 * | 11/2005 | Sagawa et al. | 315/169.1 |
| 2001/0017515 A1 | 8/2001 | Kusunoki et al. | 343/496 |

FOREIGN PATENT DOCUMENTS

| | | |
|---|---|---|
| JP | 10-153979 | 11/1996 |
| JP | 2001-273859 | 3/2000 |
| JP | 2002-367503 | 6/2001 |

OTHER PUBLICATIONS

Negishi, Nobuyasu, et al., "High Efficiency Electron-Emission in Pt/SiO/Si/A1 Structure", Japan Appl. Phys. vol. 36, 1997, pp. 939-941.

Okamoto, Shinji "Electronic discharge from EL thin film—Thin film cold cathode", NHK Science and Technical Research Laboratories, 1994, pp. 592-595 (with English translation pp. 1-4).

Koshida, Nobuyoshi, "Luminescence of Porous Silicon Indirectly and directly exceeding the frame of the transition", Department of Electronic and Information Engineering, Faculty of Technology, Tokyo University of Agriculture and Technology, 1997 pp. 437-443, (with English translation pp 1-10).

* cited by examiner

*Prior Art* FIG.1

FIG.2
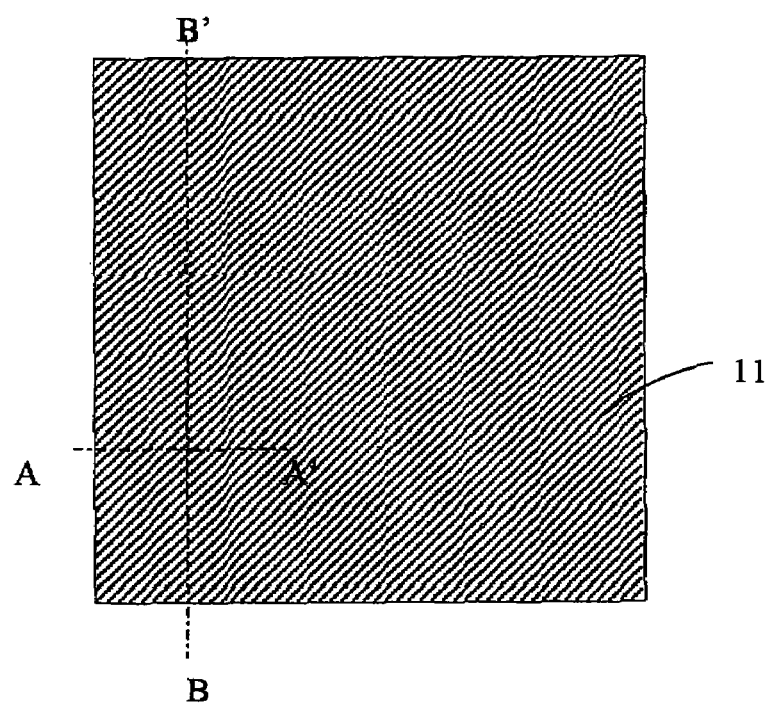
(a)
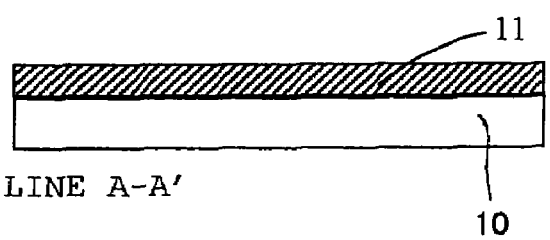
(b) SECTION TAKEN ON LINE A-A'
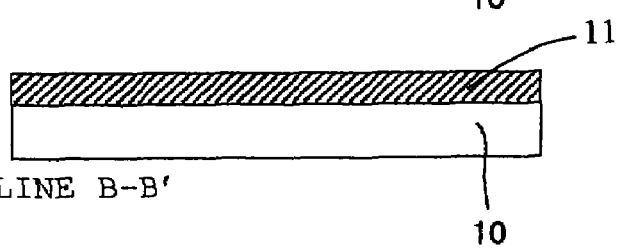
(c) SECTION TAKEN ON LINE B-B'

(a)

(b) SECTION TAKEN ON LINE A-A'

(c) SECTION TAKEN ON LINE B-B'

FIG. 5
(a)
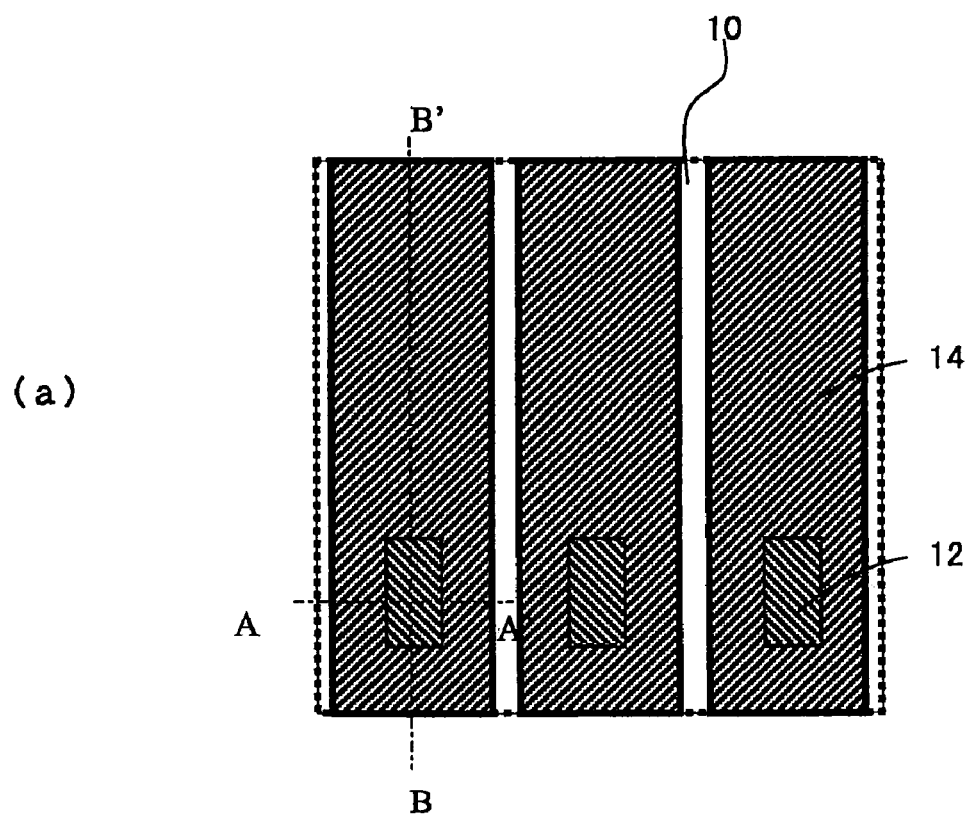
(b)
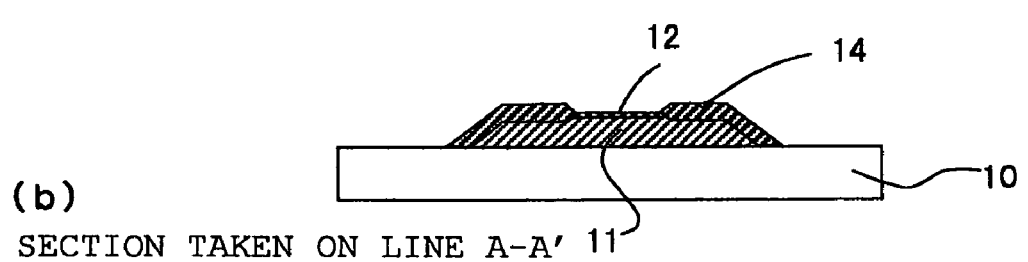
SECTION TAKEN ON LINE A-A'
(c)
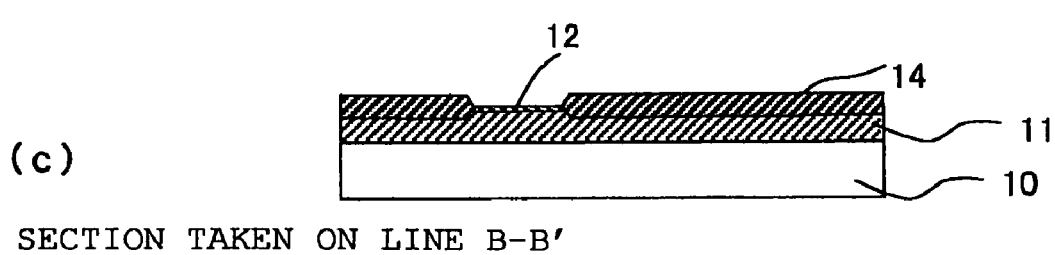
SECTION TAKEN ON LINE B-B'

(a)

(b) SECTION TAKEN ON LINE A-A'

(c) SECTION TAKEN ON LINE B-B'

FIG.7
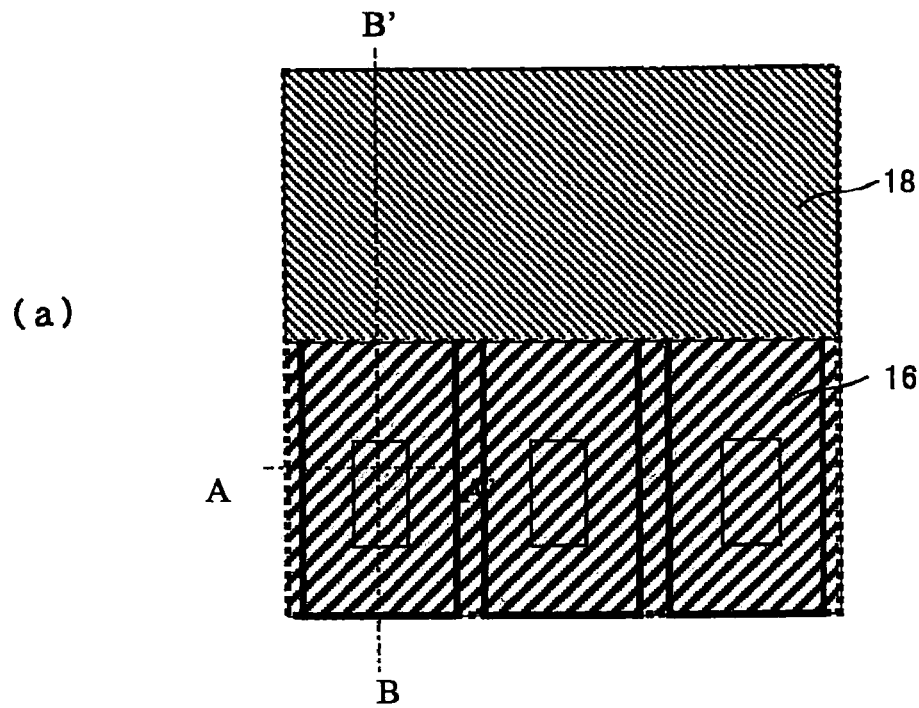
(a)
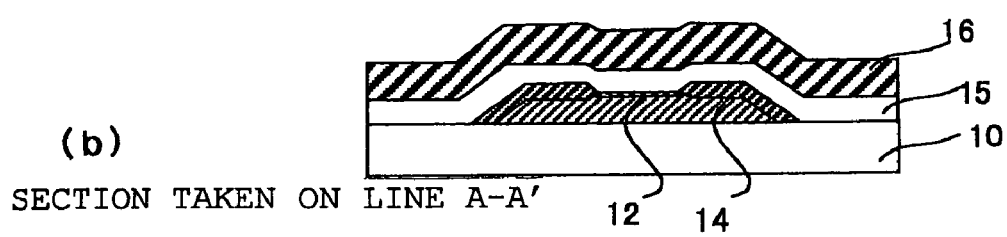
(b) SECTION TAKEN ON LINE A-A'
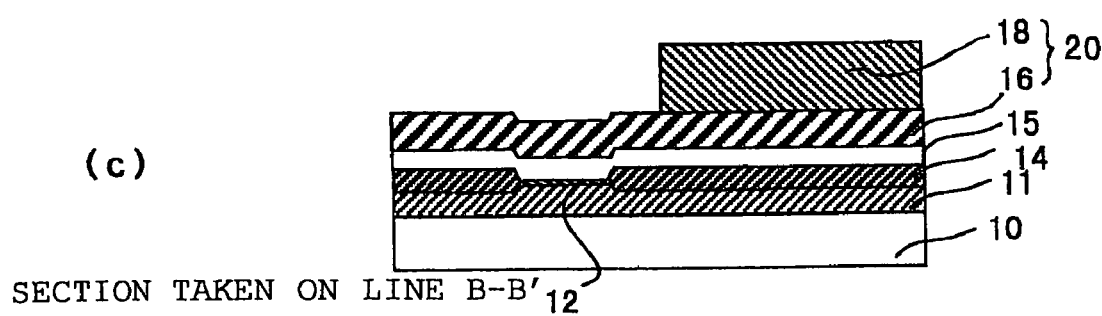
(c) SECTION TAKEN ON LINE B-B'

FIG.8
(a)
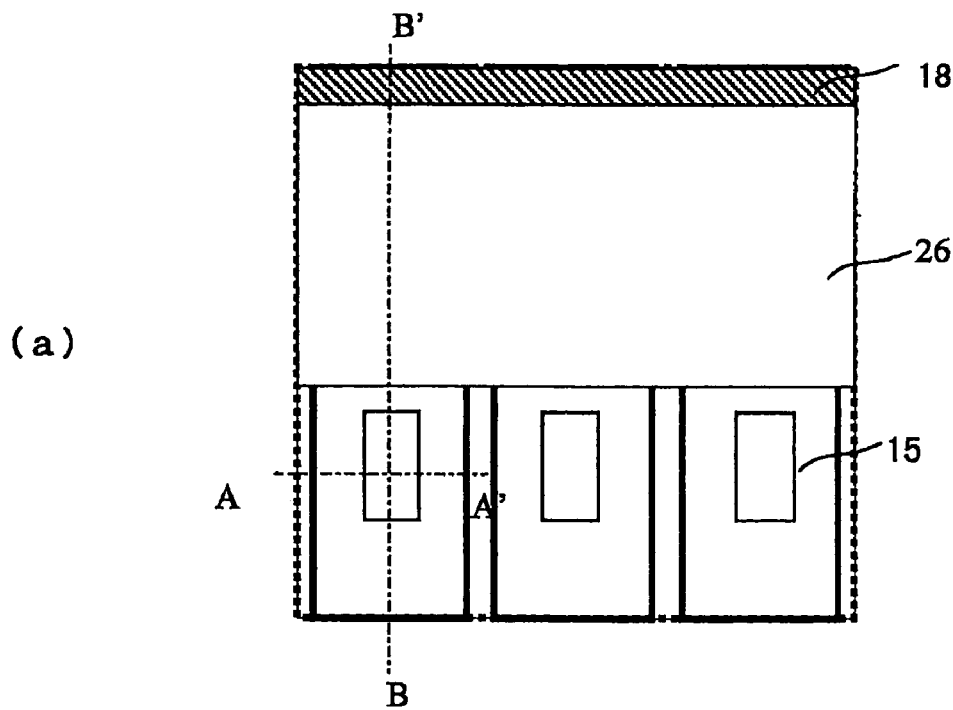
(b) SECTION TAKEN ON LINE A-A'
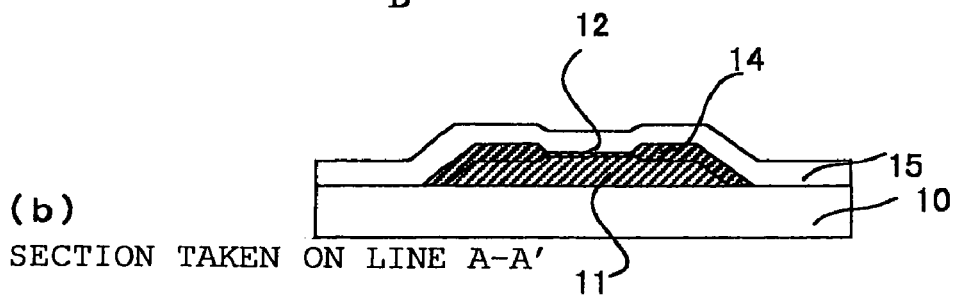
(c) SECTION TAKEN ON LINE B-B'
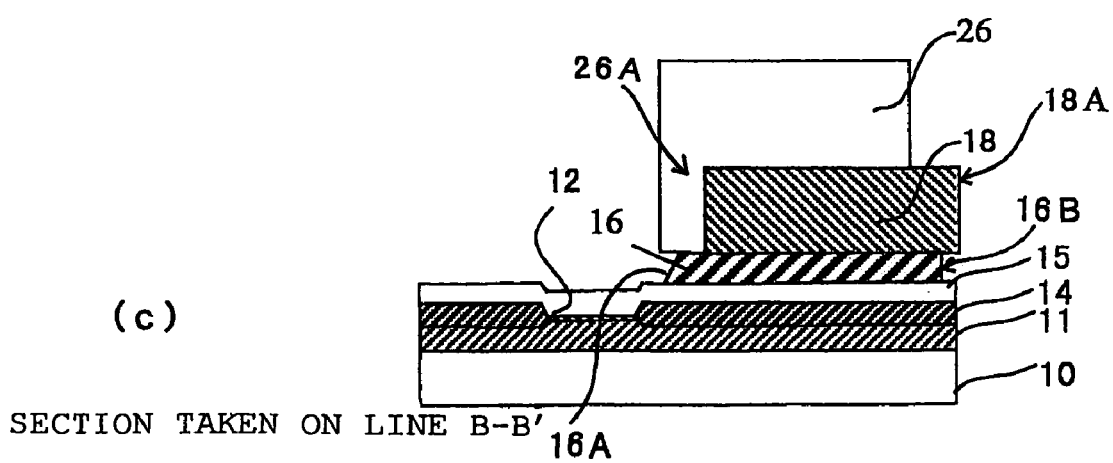

(b) SECTION TAKEN ON LINE A-A'

(c) SECTION TAKEN ON LINE B-B'

FIG.10
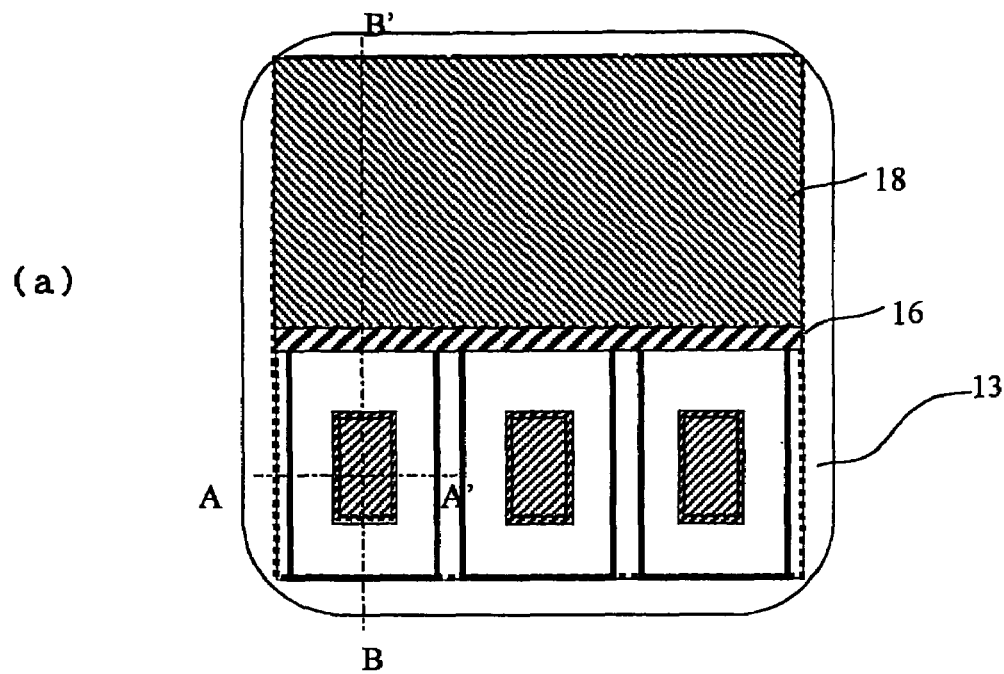
(a)
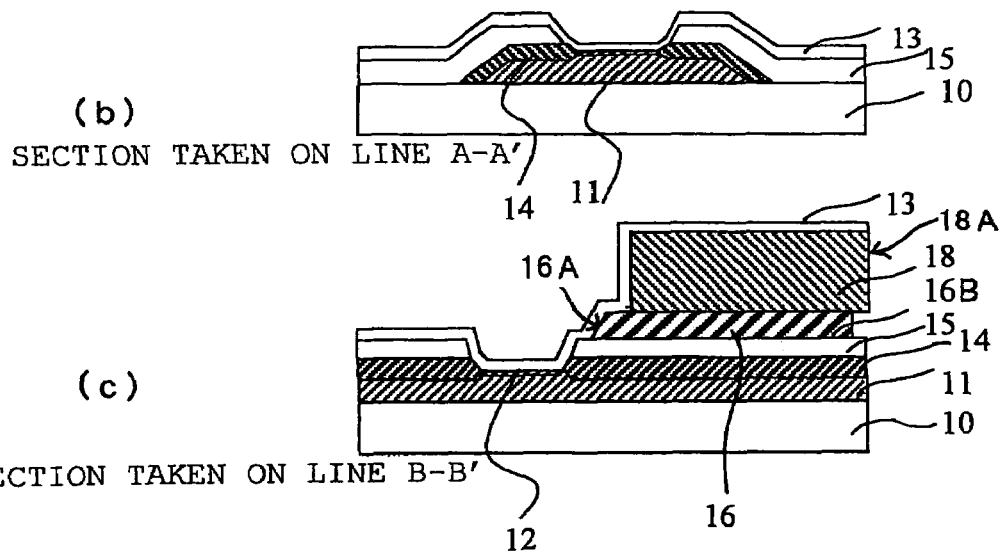
(b) SECTION TAKEN ON LINE A-A'
(c) SECTION TAKEN ON LINE B-B'

FIG.13
(a)
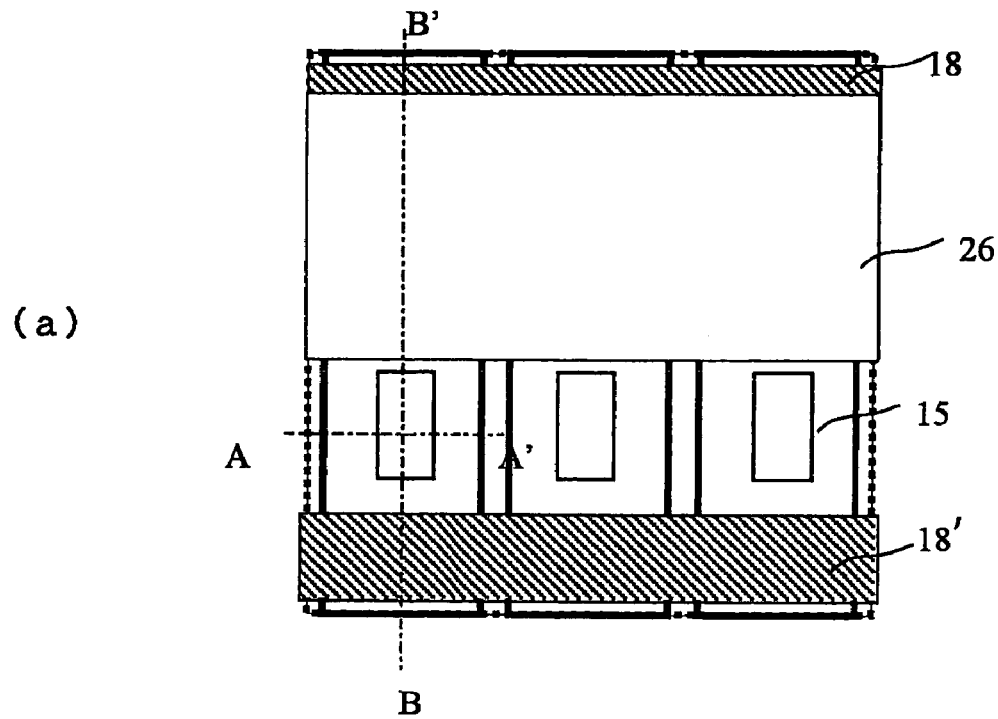
(b) SECTION TAKEN ON LINE A-A'
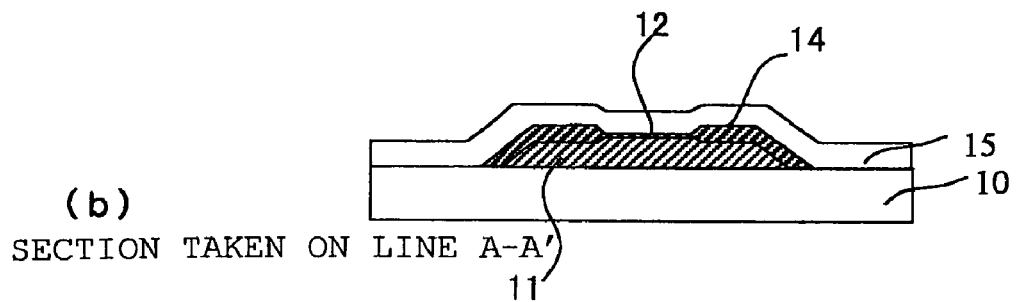
(c) SECTION TAKEN ON LINE B-B'
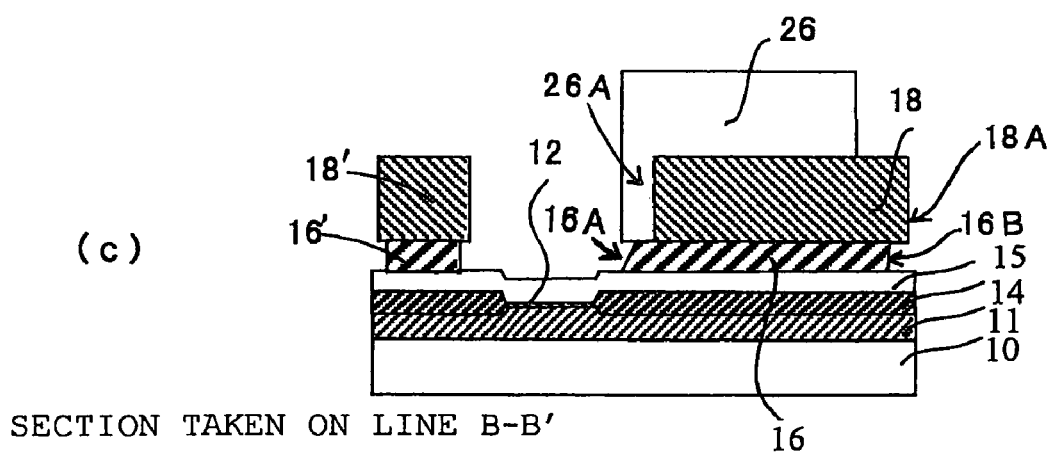

(a)

(b) SECTION TAKEN ON LINE A-A'

(c) SECTION TAKEN ON LINE B-B'

FIG.18
(a)
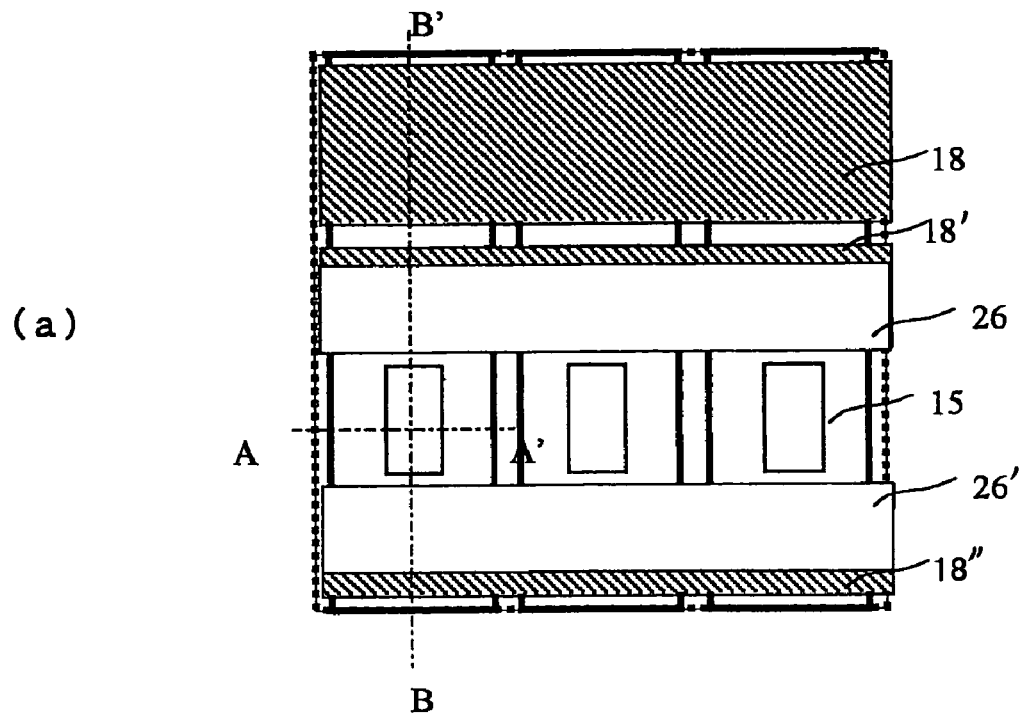
(b)
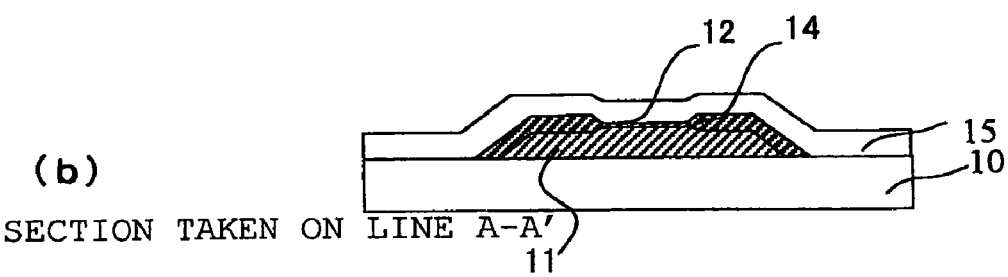
SECTION TAKEN ON LINE A-A'
(c)
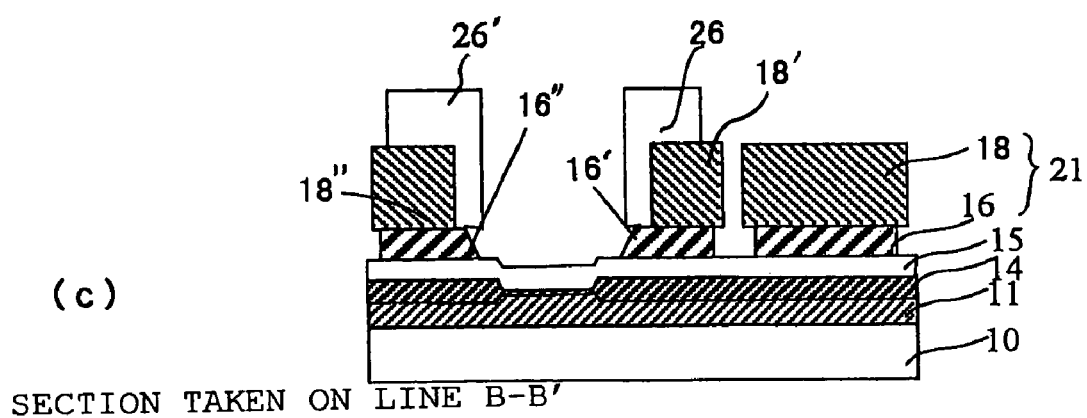
SECTION TAKEN ON LINE B-B'

FIG.19
(a)
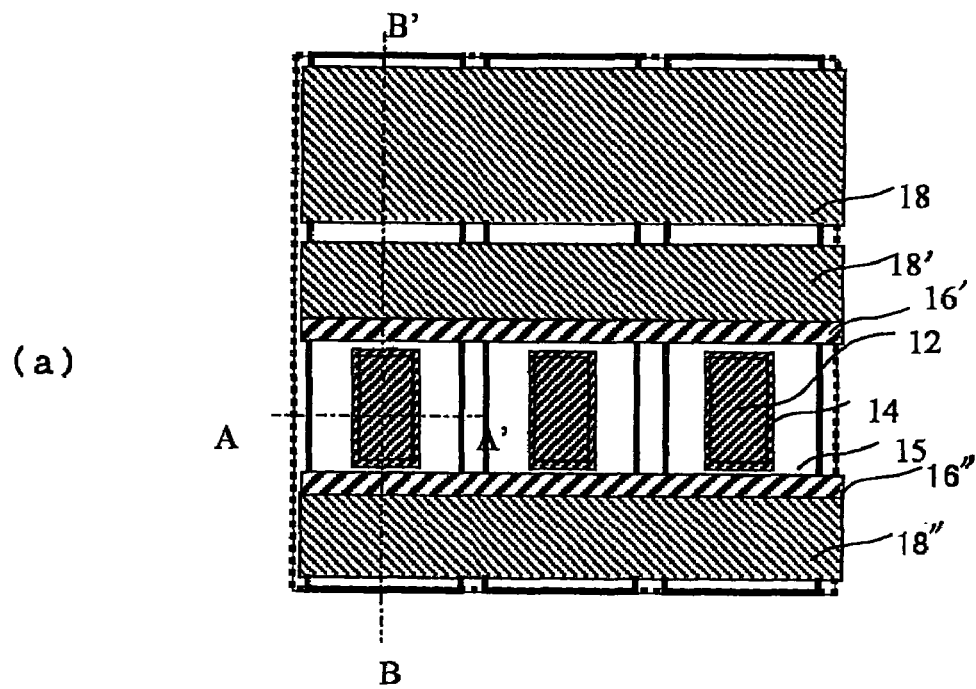
(b)
SECTION TAKEN ON LINE A-A'
(c)
SECTION TAKEN ON LINE B-B'
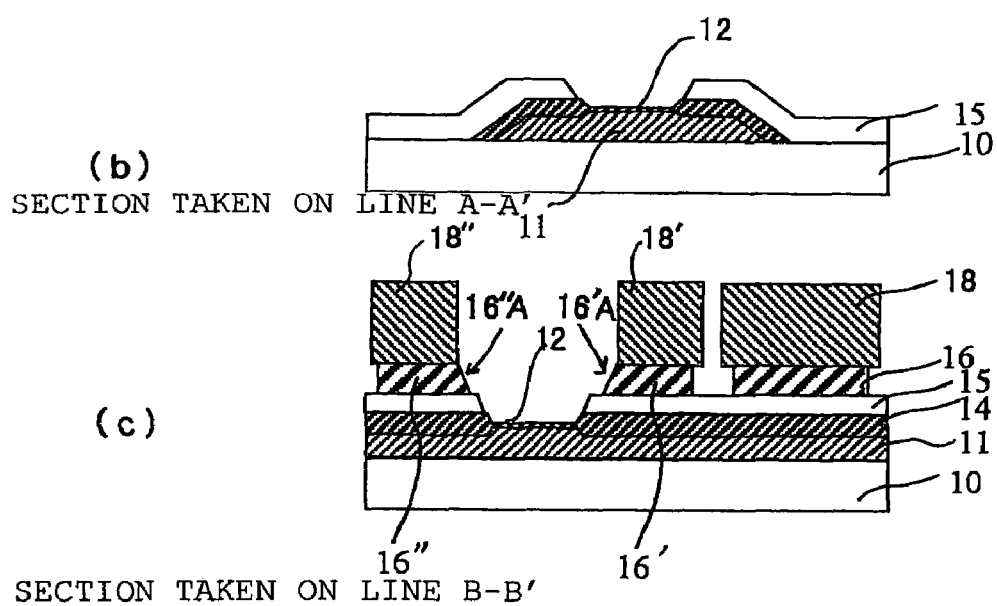

FIG.20
(a)
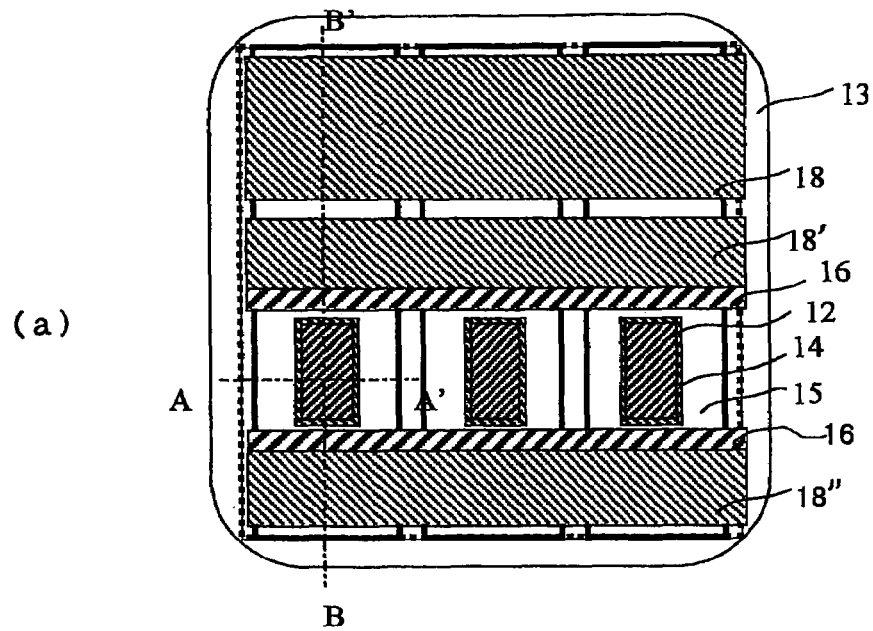
(b)
SECTION TAKEN ON LINE A-A'
(c)
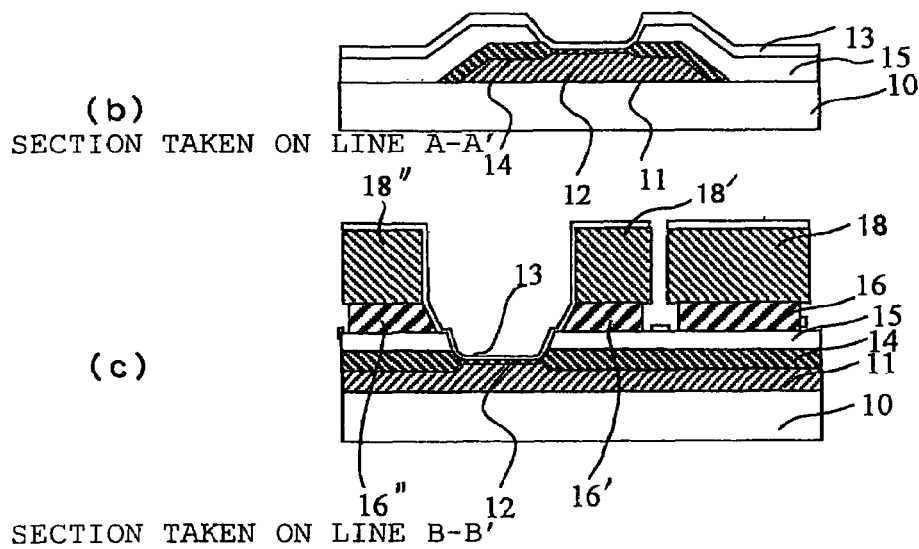
SECTION TAKEN ON LINE B-B'

(b) SECTION TAKEN ON LINE A-A'

(c) SECTION TAKEN ON LINE B-B'

(a)

(b) SECTION TAKEN ON LINE A-A'

(c) SECTION TAKEN ON LINE B-B'

FIG.25
(a)
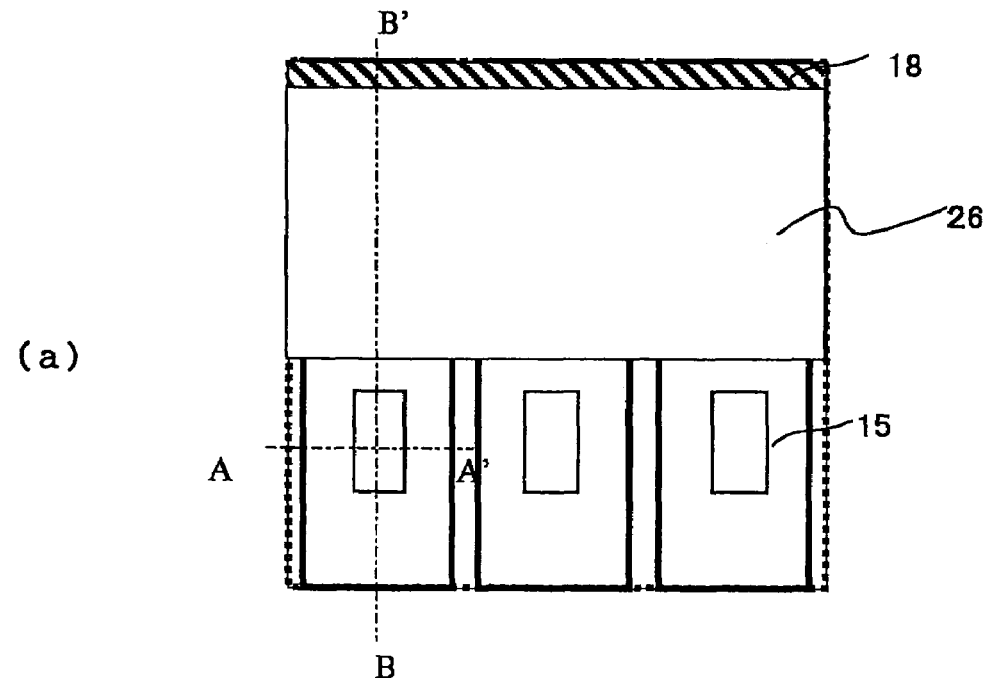
(b) SECTION TAKEN ON LINE A-A'
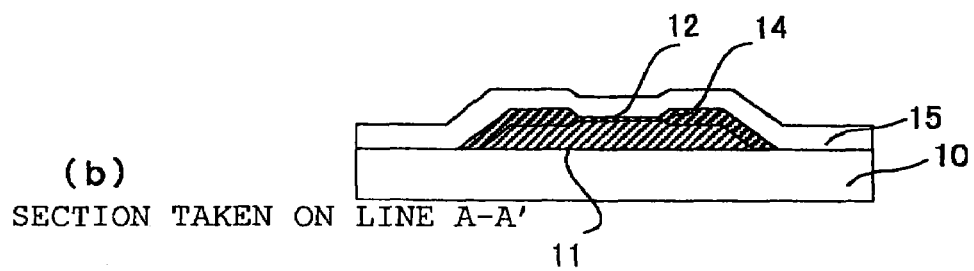
(c) SECTION TAKEN ON LINE B-B'
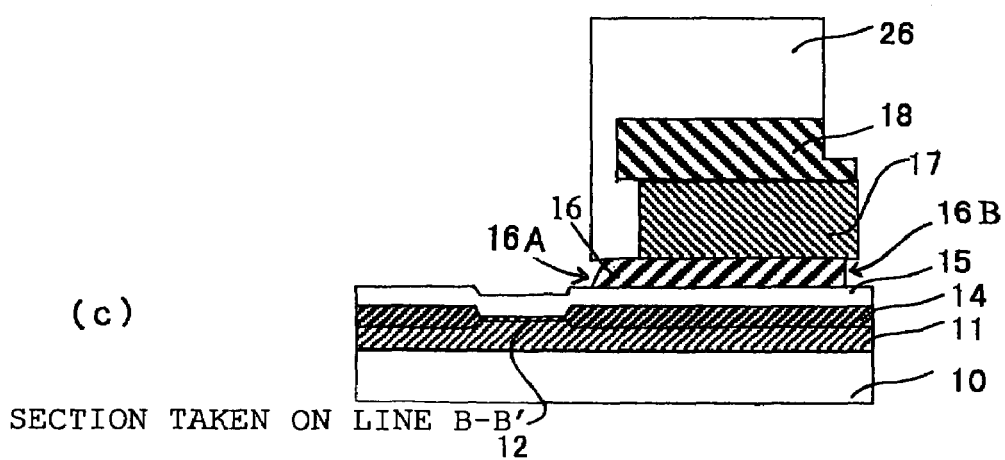

FIG.27
(a)
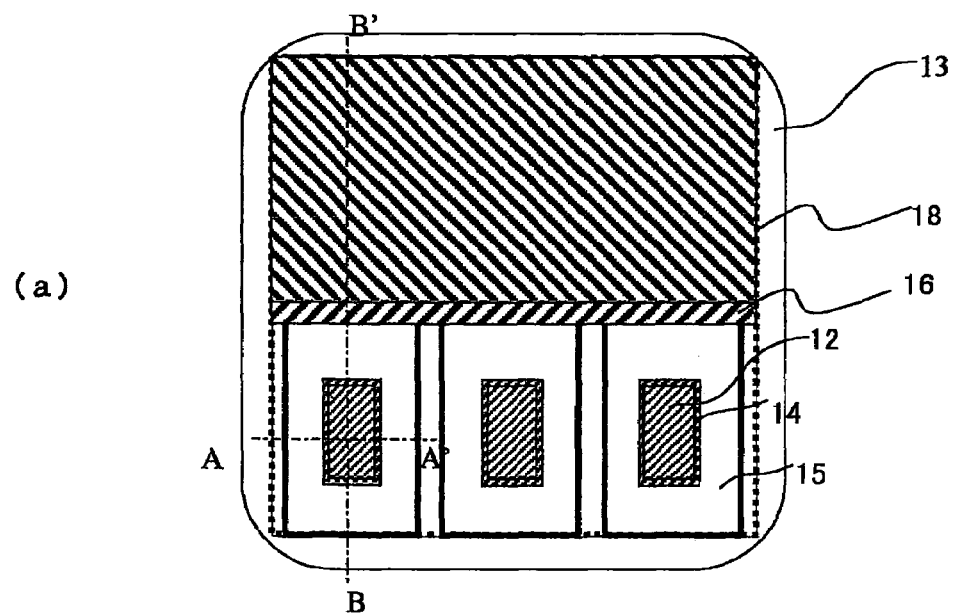
(b)
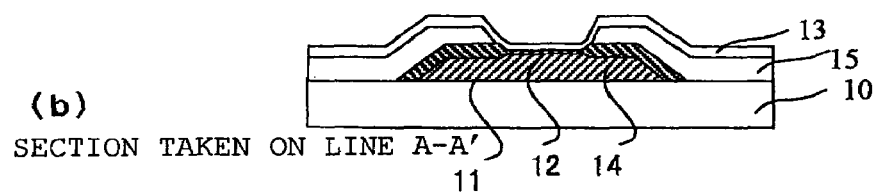
SECTION TAKEN ON LINE A-A'
(c)
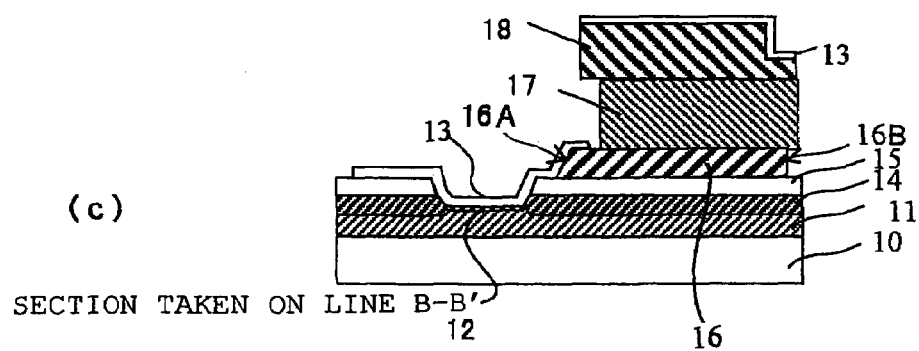
SECTION TAKEN ON LINE B-B'

(a)

(b) SECTION TAKEN ON LINE A-A'

(c) SECTION TAKEN ON LINE B-B'

DISPLAY DEVICE HAVING A THIN FILM ELECTRON SOURCE ARRAY

CROSS-REFERENCE TO RELATED APPLICATIONS

This application is a Continuation application of U.S. application Ser. No. 10/724,149 filed Dec. 1, 2003 now U.S. Pat. No. 7,129,641. Priority is claimed based on U.S. application Ser. No. 10/724,149 filed Dec. 1, 2003, which claims the priority of Japanese Patent Application No. 2002-375855 filed Dec. 26, 2002, Japanese Patent Application Nos. 2003-135267, 2003-135268, and 2003-135269 filed May 14, 2003, and Japanese Patent Application 2003-354161 filed Oct. 14, 2003, all of which are incorporated by reference.

BACKGROUND OF THE INVENTION

1. Field of the Invention

The present invention relates to a self-emitting flat panel type display device, and particularly relates to a display device using thin film type electron source arrays.

2. Description of the Related Art

An FED (Field Emission Display) using micro cold cathodes that can be integrated is known as one of self-emitting flat panel type display devices using thin film type electron source arrays. The cold cathodes of FED are categorized into field emission type electron sources and hot electron type electron sources. The former includes Spindt type electron sources, surface conduction type electron sources, carbon-nanotube type electron sources, and the like. The latter includes thin film type electron sources of an MIM (Metal-Insulator-Metal) type comprised of a metal-insulator-metal lamination, an MIS (Metal-Insulator-Semiconductor) type comprised of a metal-insulator-semiconductor lamination, a metal-insulator-semiconductor-metal type, and the like.

As the MIM type electron source, for example, an MIM type electron source disclosed in JP-A-7-65710 or JP-A-10-153979 is known. As the metal-insulator-semiconductor type electron source, an MOS type electron source reported in J. Vac. Sci. Technol. B11(2) p. 429-432 (1993) is known. As the metal-insulator-semiconductor-metal type electron source, an HEED type electron source reported in High-Efficiency-Electro-Emission Device, Jpn. J. Appl. Phys., Vol. 36, p. L939 or the like is known, an EL type electron source reported in Electroluminescence, OYO-BUTURI, Vol. 63, No. 6, p. 592 or the like is known, or a porous silicon type electron source reported in OYO-BUTURI, Vol. 66, No. 5, p. 437 or the like is known. Incidentally, the MIM type electron source is disclosed in each of those documents.

FIG. 1 is a view for explaining the structure of an MIM type electron source and the principle of operation thereof. In FIG. 1, the reference numeral 11 represents a lower electrode; 13, an upper electrode; 12, an insulating layer; and 23, a vacuum atmosphere. In the vacuum atmosphere, a driving voltage Vd is applied between the upper electrode 13 and the lower electrode 11 so as to set the electric field in the insulating layer 12 to reach about 1-10 MV/cm. In this event, electrons e⁻ near the Fermi level in the lower electrode 11 penetrate a barrier due to a tunneling phenomenon, so as to be injected into a conducting band of the insulating layer 12 as an electron accelerating layer. Hot electrons formed thus flow into a conducting band of the upper electrode 13. Of the hot electrons, ones reaching the surface of the upper electrode 13 with energy not smaller than a work function $\phi$ of the upper electrode 13 are released to the vacuum 23.

It is desired that thin film type electron source arrays applied to a display device or the like can be manufactured with a simple structure and in a simple process in order to attain reduction in cost. A photolithographic method (also referred to as a photo-etching method) is conventionally used for processing thin film type electron sources. However, an exposure device used in a photolithographic process (also referred to as a photo-process simply) is expensive. In addition, associated processes required before and after the photolithographic process, such as coating with resist, pre-baking, exposure, development, post-baking, removing, and cleansing, are long, and the process cost thereof is high.

In contrast, if resist can be printed by screen printing or the like, the cost of the manufacturing apparatus can be reduced. In addition, since the resist can be patterned directly, the processes required before and after the photolithographic process, such as coating, pre-baking and development, can be omitted so that the process cost can be reduced. However, the resist patterning accuracy using the printing method is incommensurably lower than the accuracy using the photo-etching method. Thus, there is a problem in application of the printing method to processing of conventional thin film type electron sources.

When a pattern involving the accuracy of pattern matching in only one lengthwise or crosswise direction is used, the processing accuracy in the resist patterning can be loosened and the printing method can be applied easily in comparison with a pattern involving the accuracy of pattern matching in both the lengthwise and crosswise directions. In the present invention, such a shape involving the accuracy of pattern matching in only one direction is referred to as "stripe shape" in the sense that the shape needs accuracy in only one dimension. In addition, an electrode having a stripe shape pattern is referred to as "stripe electrode". That is, the stripe electrode is a linear electrode having a width with a structure having no hole, no convex portion, no concave portion, no curved portion, etc. intentionally formed in the electrode.

Particularly, when a printing method such as screen printing, dispenser printing, inkjet printing or transfer printing is used as the patterning method, the stripe electrode is preferred because the stripe electrode is a little affected by deterioration of the patterning accuracy caused by stretch of a screen, a blur of printed resist, or the like.

BRIEF SUMMARY OF THE INVENTION

In order to reduce manufacturing cost of a display device, an object of the present invention is to provide a thin film type electron source using a stripe electrode easy to process in an image display area involving a pattern matching process, and to provide a display device using such thin film type electron sources at a low cost.

In order to attain the foregoing object, according to the present invention, an electron accelerating layer of a thin film electron source is put between two adjacent stripe electrodes, and an upper electrode is divided by self-alignment so as to attain pixel separation in the thin film electron source.

A thin film electron source can be produced using a stripe electrode easy to pattern for each sub-pixel. Further, an upper electrode can be processed by self-alignment. Thus, a display device can be obtained at a low cost.

BRIEF DESCRIPTION OF THE DRAWINGS

FIGS. 2A-2C are diagrams for explaining a step for manufacturing an MIM electron source forming one pixel in a first embodiment of a display device according to the present invention;

FIGS. 5A-5C are diagrams for explaining a step for manufacturing the MIM electron source forming one pixel in the first embodiment of the display device according to the present invention, the step following the step in FIGS. 4A-4C;

FIGS. 7A-7C are diagrams for explaining a step for manufacturing the MIM electron source forming one pixel in the first embodiment of the display device according to the present invention, the step following the step in FIGS. 6A-6C;

FIGS. 8A-8C are diagrams for explaining a step for manufacturing the MIM electron source forming one pixel in the first embodiment of the display device according to the present invention, the step following the step in FIGS. 7A-7C;

FIGS. 10A-10C are diagrams for explaining a step for manufacturing the MIM electron source forming one pixel in the first embodiment of the display device according to the present invention, the step following the step in FIGS. 9A-9C;

FIGS. 13A-13C are diagrams for explaining a step for manufacturing the MIM electron source forming one pixel in the second embodiment of the display device according to the present invention, the step following the step in FIGS. 12A-12C;

FIGS. 18A-18C are diagrams for explaining a step for manufacturing the MIM electron source forming one pixel in the third embodiment of the display device according to the present invention, the step following the step in FIGS. 17A-17C;

FIGS. 19A-19C are diagrams for explaining a step for manufacturing the MIM electron source forming one pixel in the third embodiment of the display device according to the present invention, the step following the step in FIGS. 18A-18C;

FIGS. 20A-20C are diagrams for explaining a step for manufacturing the MIM electron source forming one pixel in the third embodiment of the display device according to the present invention, the step following the step in FIGS. 19A-19C;

FIGS. 25A-25C are diagrams for explaining a step for manufacturing the MIM electron source forming one pixel in the fourth embodiment of the display device according to the present invention, the step following the step in FIGS. 24A-24C;

FIGS. 27A-27C are diagrams for explaining a step for manufacturing the MIM electron source forming one pixel in the fourth embodiment of the display device according to the present invention, the step following the step in FIGS. 26A-26C;

DETAILED DESCRIPTION OF THE INVENTION

Figure 1:
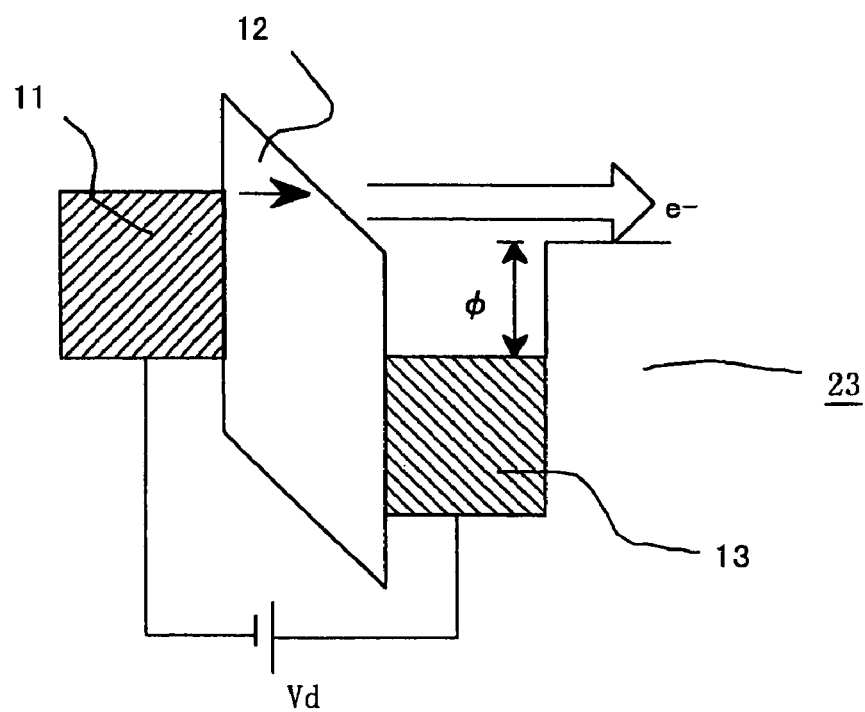
FIG. 1 is a view for explaining the structure of an MIM type electron source and the principle of operation thereof.
Figure 3:
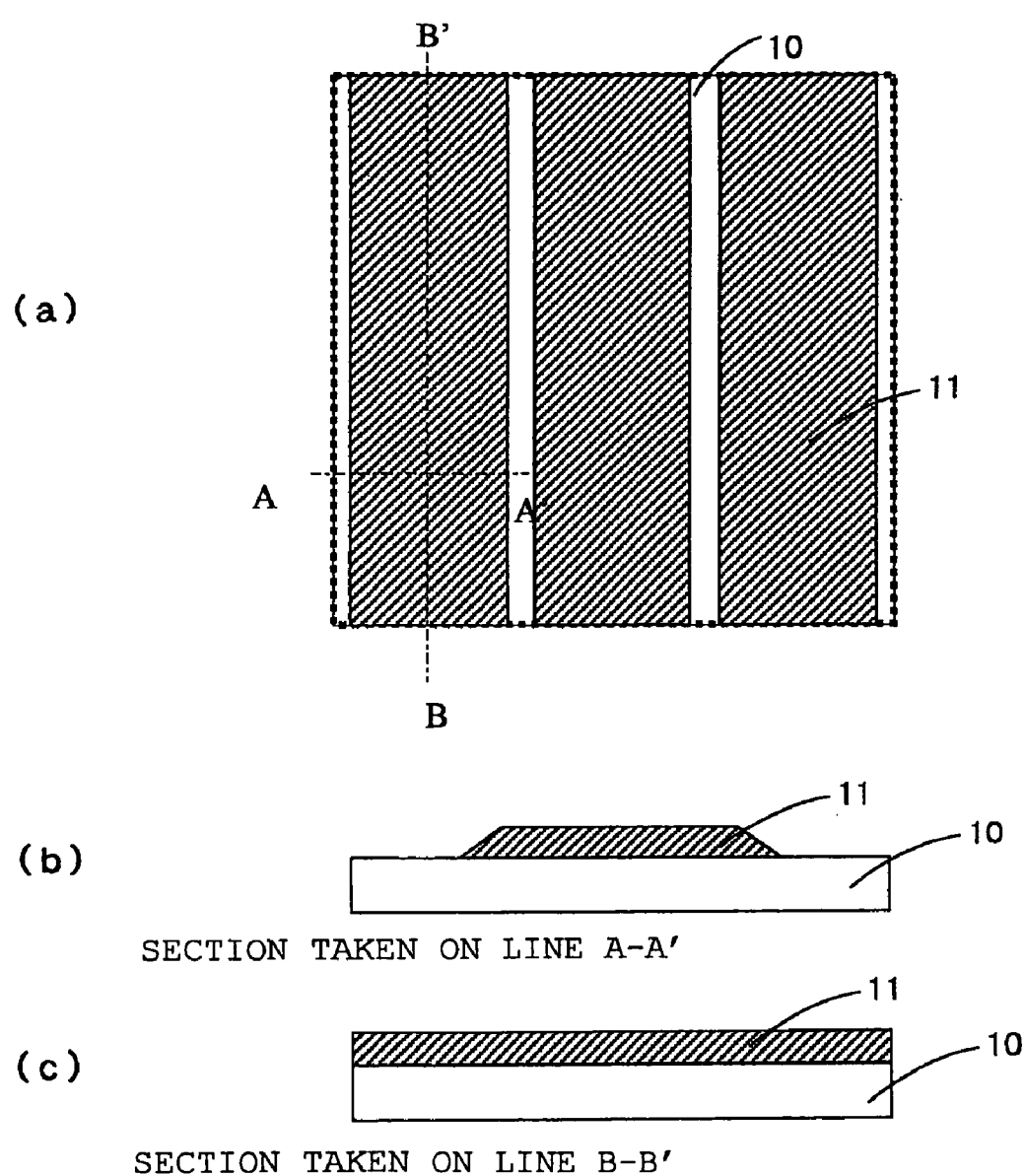
FIGS. 3A-3C are diagrams for explaining a step for manufacturing the MIM electron source forming one pixel in the first embodiment of the display device according to the present invention, the step following the step in FIGS. 2A-2C.
Figure 4:
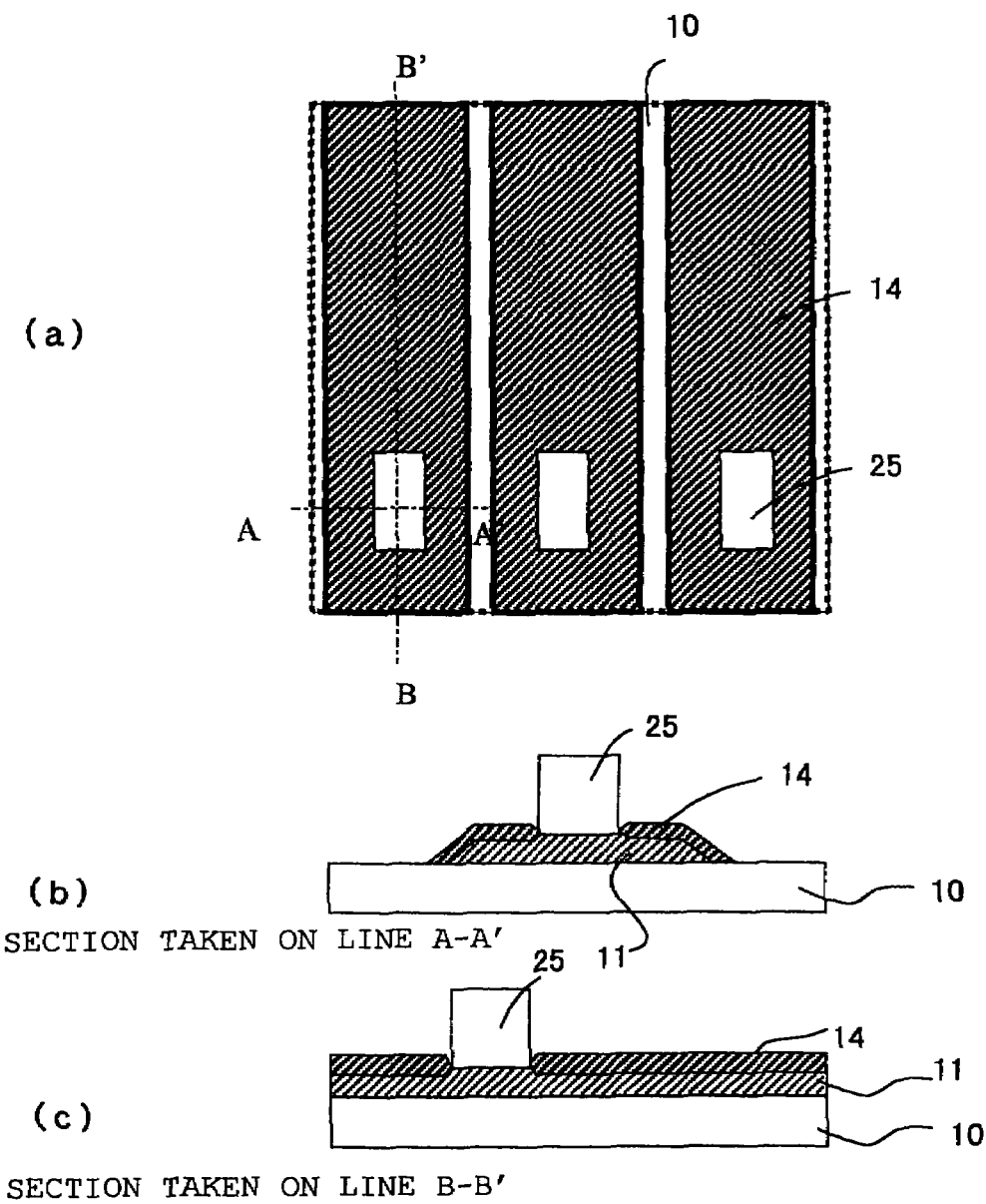
FIGS. 4A-4C are diagrams for explaining a step for manufacturing the MIM electron source forming one pixel in the first embodiment of the display device according to the present invention, the step following the step in FIGS. 3A-3C.
Figure 6:
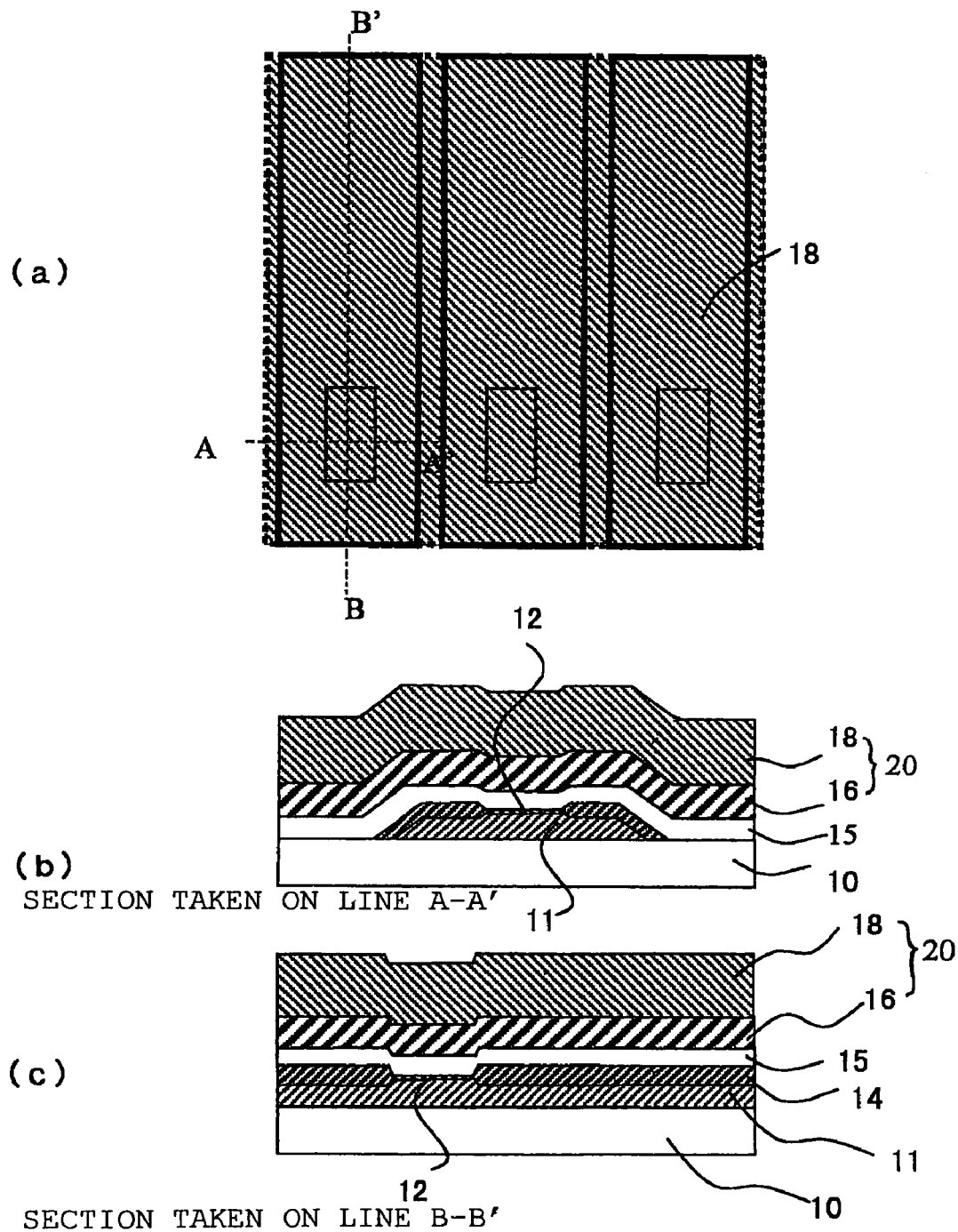
FIGS. 6A-6C are diagrams for explaining a step for manufacturing the MIM electron source forming one pixel in the first embodiment of the display device according to the present invention, the step following the step in FIGS. 5A-5C.
Figure 9:
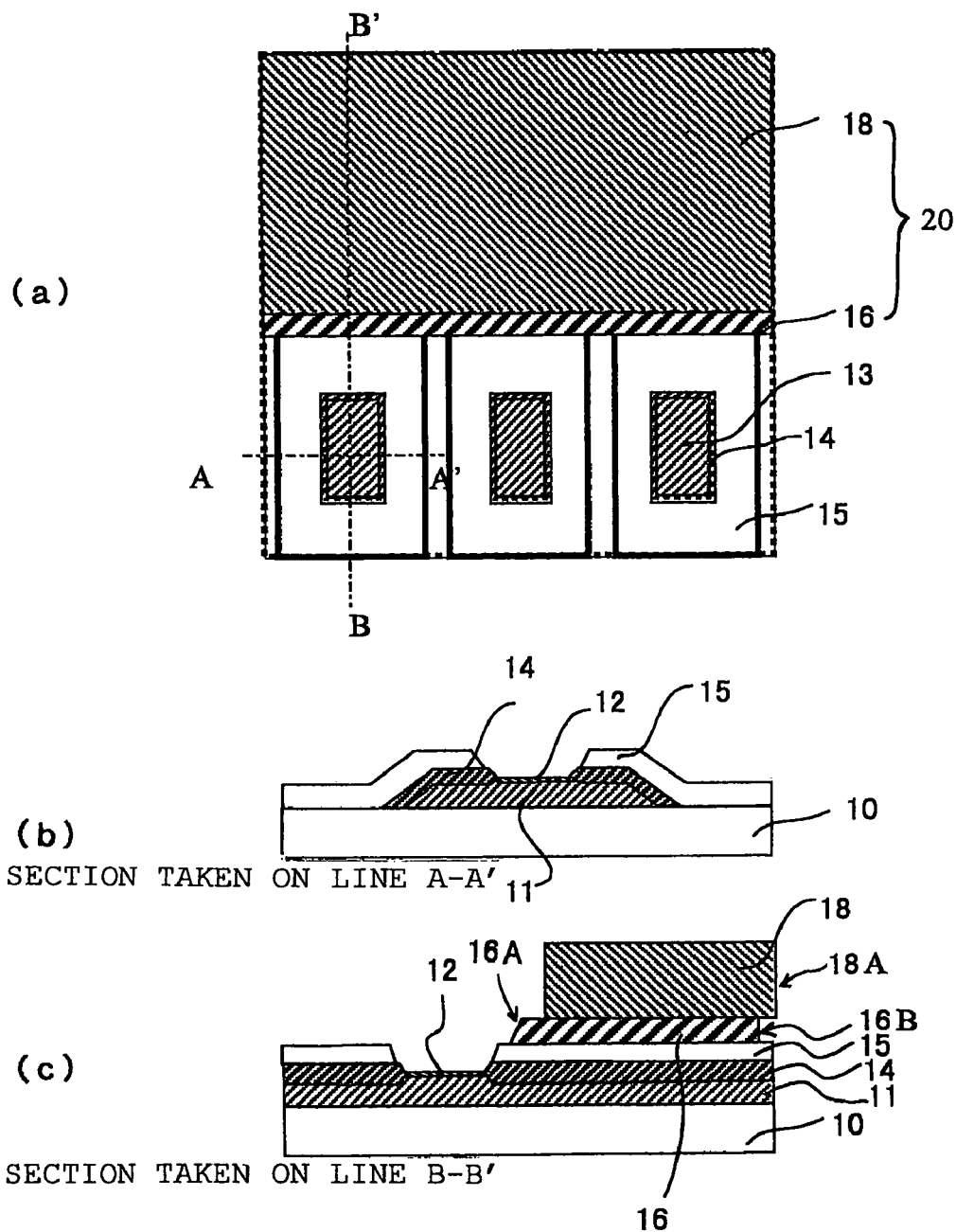
FIGS. 9A-9C are diagrams for explaining a step for manufacturing the MIM electron source forming one pixel in the first embodiment of the display device according to the present invention, the step following the step in FIGS. 8A-8C.

Embodiments of the present invention will be described below in detail with reference to the drawings.

First Embodiment

A first embodiment of the present invention using MIM electron sources will be described with reference to FIGS. 2A-2C to FIGS. 10A-10C and FIG. 11. FIGS. 2A-2C to 10A-10C are diagrams for explaining manufacturing steps of an MIM electron source forming one picture element in the first embodiment of a display device according to the present invention. The steps are illustrated in turn in FIGS. 2A-2C to FIGS. 10A-10C. FIGS. 2A-10A are plan views of one picture element. FIGS. 2B-10B are sectional views taken on line A-A' in FIGS. 2A-10A respectively. FIGS. 2C-10C are sectional views taken on line B-B' in FIGS. 2A-10A respectively. Incidentally, one picture element (also referred to as "pixel") here means a unit picture element for color display. Each picture element is comprised of a plurality of sub-picture elements (hereinafter referred to as "sub-pixels") displaying different primary colors respectively. In this embodiment, the sub-picture elements include three primary color sub-picture elements of red, green and blue.

First, as shown in FIGS. 2A-2C, a metal film which will be made into lower electrodes 11 is formed on an insulating substrate (cathode substrate) 10 of glass or the like. Aluminum (Al) or an aluminum alloy (Al alloy) is used as the material of the lower electrodes 11. The reason why Al or an AL alloy is used is that a high-quality insulating film can be formed by anodization of these materials. In this embodiment, an Al—Nd alloy doped with 2% by atomic weight of neodymium (Nd) is used. For example, a sputtering method is used for forming the film of the lower electrodes 11. The film thickness is set at 300 nm. After forming the film, stripe-shaped lower electrodes 11 are formed by a patterning step and an etching step (see FIGS. 3A-3C).

The electrode width of each lower electrode 11 varies according to the screen size and resolution of the display device, but is set substantially as large as the alignment pitch of its sub-pixels (about 100-200 μm). The film of the lower electrodes 11 is etched, for example, by wet etching with a mixed aqueous solution of phosphoric acid, acetic acid and nitric acid. Since the lower electrodes 11 have a wide and simple stripe shape, an inexpensive printing method can be used for patterning resist for electrode processing. A screen printing method is used in this embodiment. Not to say, a comparatively inexpensive photo-etching process such as proximity exposure can be used instead. Thus, reduction in cost can be attained in comparison with exposure using a stepper, a projection aligner or the like.

Next, a protective insulating layer 14 and an insulating layer 12 are formed for limiting each electron emitting portion to thereby prevent an electric field from concentrating on an edge of each lower electrode 11. First, a resist film 25 is applied to the portion which will be an electron emitting portion on each lower electrode 11, so that the lower electrode 11 is masked with the resist film 25. The portion which is not masked with the resist film 25 is anodized to be selectively thick so as to form the protective insulating layer 14 (FIGS. 4A-4C). The resist film 25 used in this step has a shape as an electron accelerating layer. It is therefore desired that the processing accuracy is higher than that of the electrodes. To this end, the resist film 25 is patterned not in a printing method but in a photolithographic process using proximity exposure in this embodiment. When the anodization is performed with a formation voltage of 100V, the protective insulating layer 14 is formed with a thickness of about 136 nm.

Next, the resist film 25 is removed, and the remaining surface of each lower electrode 11 is anodized. For example, when the formation voltage is 6V, the insulating layer 12 is formed with a thickness of about 10 nm on the lower electrode 11 (FIGS. 5A-5C).

Next, an interlayer film 15 is formed, and a metal film for forming upper bus electrodes 20 as feed lines to upper electrodes 13 is formed on the interlayer film 15, for example, in a sputtering method (FIGS. 6A-6C). For example, a silicon oxide film, a silicon nitride film, a silicon film or the like may be used as the interlayer film 15. In this embodiment, a silicon nitride film is used, and the film thickness is set at 100 nm. The interlayer film 15 serves to fill up possible pinholes in the protective insulating layer 14 formed by anodization so as to secure insulation between each lower electrode 11 and each upper bus electrode.

The metal film serving as the upper bus electrodes 20 has a structure of a lamination of a metal film lower layer 16 and a metal film upper layer 18. For example, an Al—Nd alloy may be used for the metal film lower layer 16, and various metal materials such as copper (Cu) or chromium (Cr) may be used for the metal film upper layer 18. In this embodiment, an Al—Nd alloy is used as the material of the metal film lower layer 16, and Cu is used as the material of the metal film upper layer 18.

Subsequently, the metal film upper layer 18 is processed into a stripe shape crossing each lower electrode 11 by patterning of resist using screen printing and an etching process. Stripe electrodes of the metal film upper layer 18 are formed so that one stripe electrode is formed in one pixel (FIGS. 7A-7C). Incidentally, other stripe electrodes adjacent to the stripe electrode illustrated by the metal film upper layer 18 are not shown in FIG. 7A (the same thing will be applied to the following embodiments).

Subsequently, the metal film lower layer 16 is processed into a stripe shape crossing each lower electrode 11 by patterning of resist using screen printing and an etching process. Stripe electrodes of the metal film lower layer 16 are also formed so that one stripe electrode is formed in one pixel (FIGS. 8A-8C). At that time, the position of a resist film 26 printed is shifted in parallel with each stripe electrode of the metal film upper layer 18 formed in FIGS. 7A-7C, so that the resist film 26 projects from the metal film upper layer 18 on one side (left side in FIG. 8C) of each stripe electrode of the metal film lower layer 16 so as to form a projecting portion 26A. Etching is suppressed by covering the metal film lower layer 16 with the projecting portion 26A so that a contact portion 16A for securing connection with a corresponding upper electrode 13 which will be formed in a subsequent step and will be described with reference to FIGS. 10A-10C is formed. On the opposite side (right side in FIG. 8C), an appentice 18A is formed in the metal film upper layer 18 so as to serve as a mask with which a setback portion 16B for separating the upper electrodes 13 will be formed by over-etching of the metal film lower layer 16 in a subsequent step. Thus, each upper bus electrode 20 (the laminated film of the metal film lower layer 16 and the metal film upper layer 18) for feeding power to each upper electrode 13 can be formed.

Subsequently, as shown in FIGS. 9A-9C, the interlayer film 15 is processed to open each electron release portion. The electron release portion is formed in a part of the space surrounded by one lower electrode 11 in that pixel and two stripe-shaped upper bus electrodes 20 (the illustrated upper bus electrode 20 and another not-illustrated upper bus electrode 20 adjacent thereto) crossing the lower electrode 11. Patterning of resist at that time is performed using proximity exposure because the pattern is a hole pattern. In addition, etching processing can be performed by dry etching using etching gas, for example, having $CF_4$ or $SF_6$ as a chief component (FIGS. 9A-9C).

Finally, a film of the upper electrodes 13 shown in FIGS. 10A-10C is formed. Although various methods can be adopted as the method for forming the film, sputtering from above the interlayer film 15 is used in this embodiment. For example, a laminated film of iridium (Ir), platinum (Pt) and gold (Au) is used as the film of the upper electrodes 13, and the thickness of the film is set at 6 nm. Incidentally, the film thickness is not limited thereto. In this event, each upper electrode 13 is cut on one side (right side in FIG. 10C) of the adjacent stripe-shaped upper bus electrode 20 by the appentice of the metal film upper layer 18 thereof, so as to be separated in accordance with each pixel. On the other hand, on the other side (left side in FIG. 10C) of the stripe-shaped upper bus electrode 20, the film serving as the upper electrode 13 is formed continuously without disconnection to cover the interlayer film 15 or the insulating layer 12 due to the contact portion of the metal film lower layer 16. Thus, a structure to feed power to the electron source is arranged. The same thing about the formation of the film serving as the upper electrodes 13 is applied to the following embodiments that will be described later.

Figure 11:
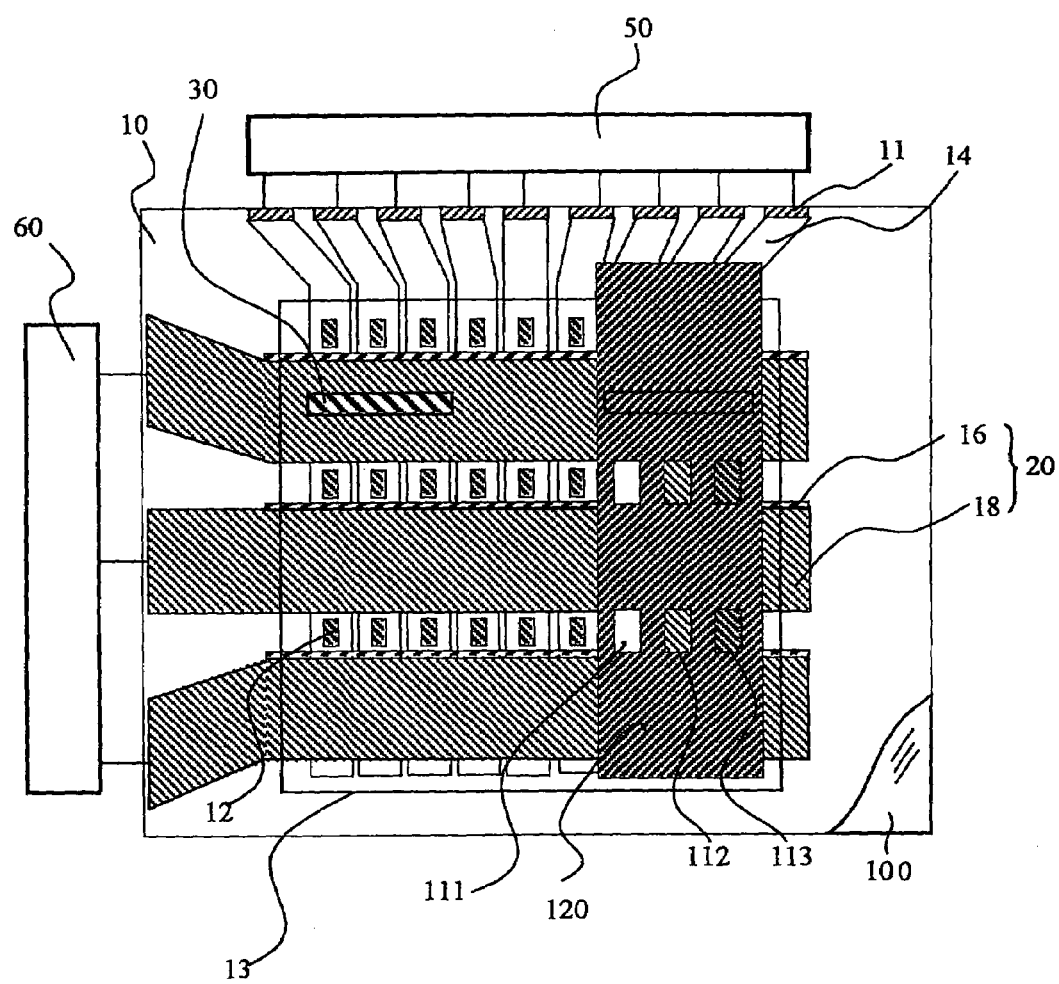
FIG. 11 is a partially enlarged schematic plan view for explaining the structure of the first embodiment of the display device according to the present invention.
Figure 12:
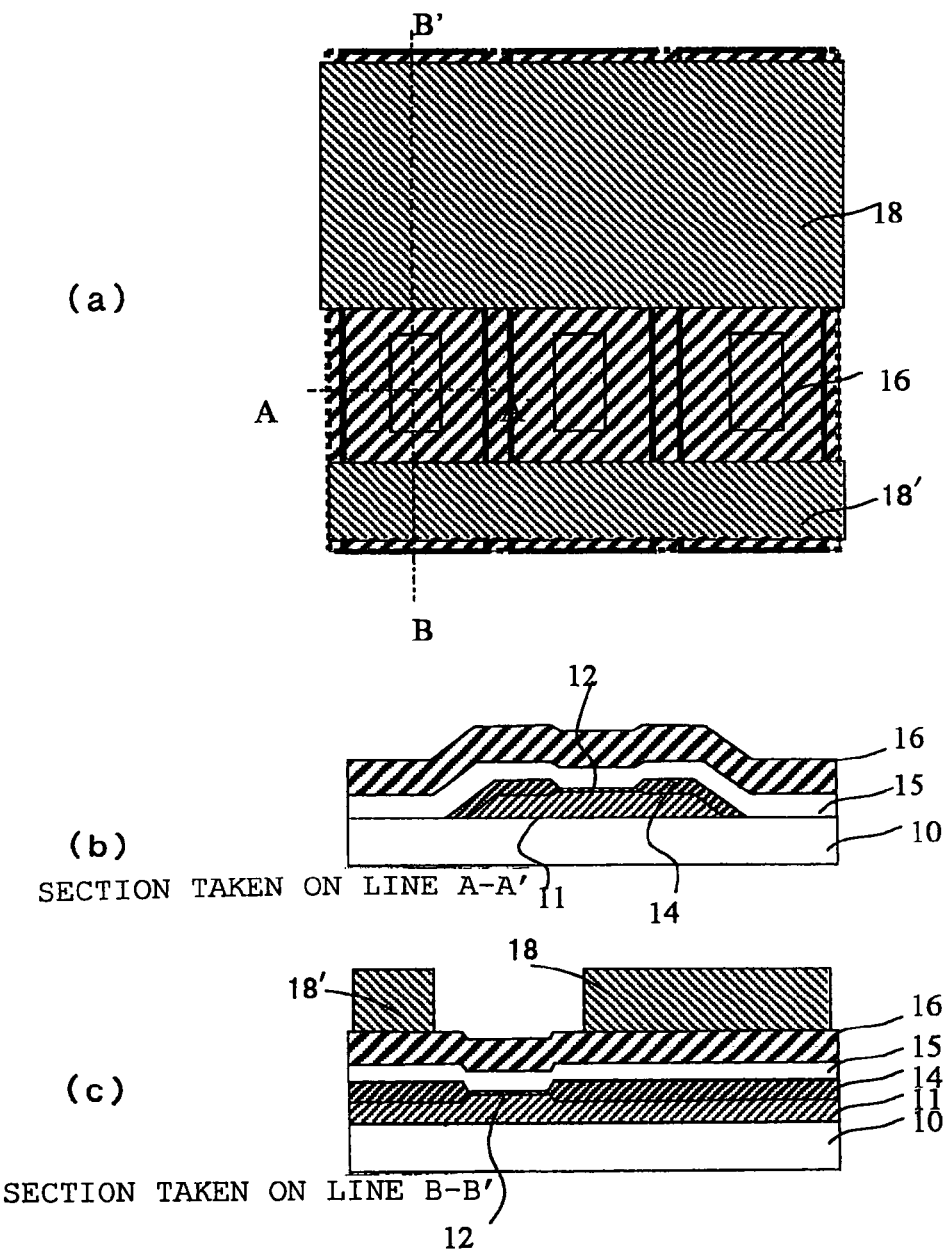
FIGS. 12A-12C are diagrams for explaining a step for manufacturing an MIM electron source forming one pixel in a second embodiment of the display device according to the present invention.
Figure 14:
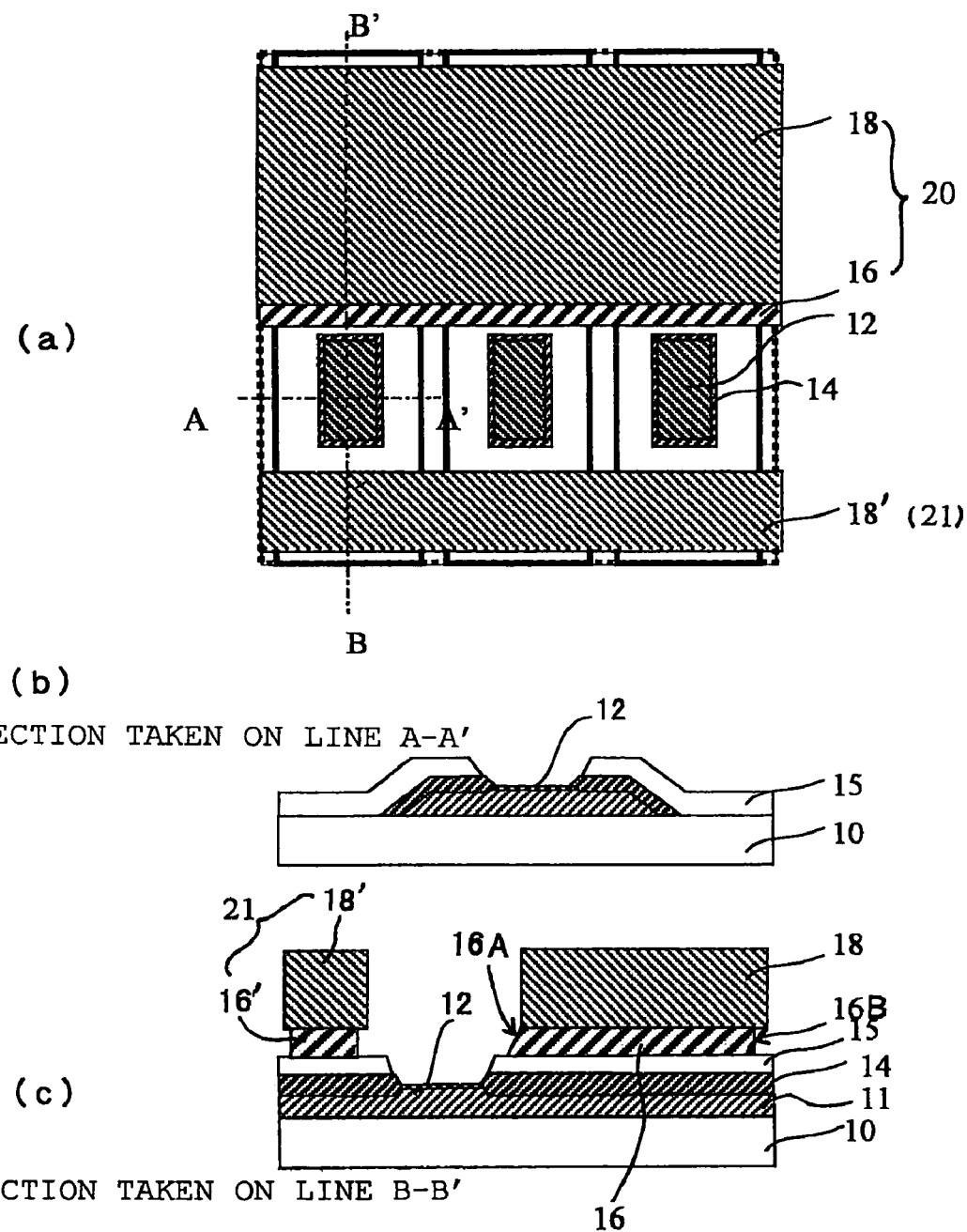
FIGS. 14A-14C are diagrams for explaining a step for manufacturing the MIM electron source forming one pixel in the second embodiment of the display device according to the present invention, the step following the step in FIGS. 13A-13C.
Figure 15:
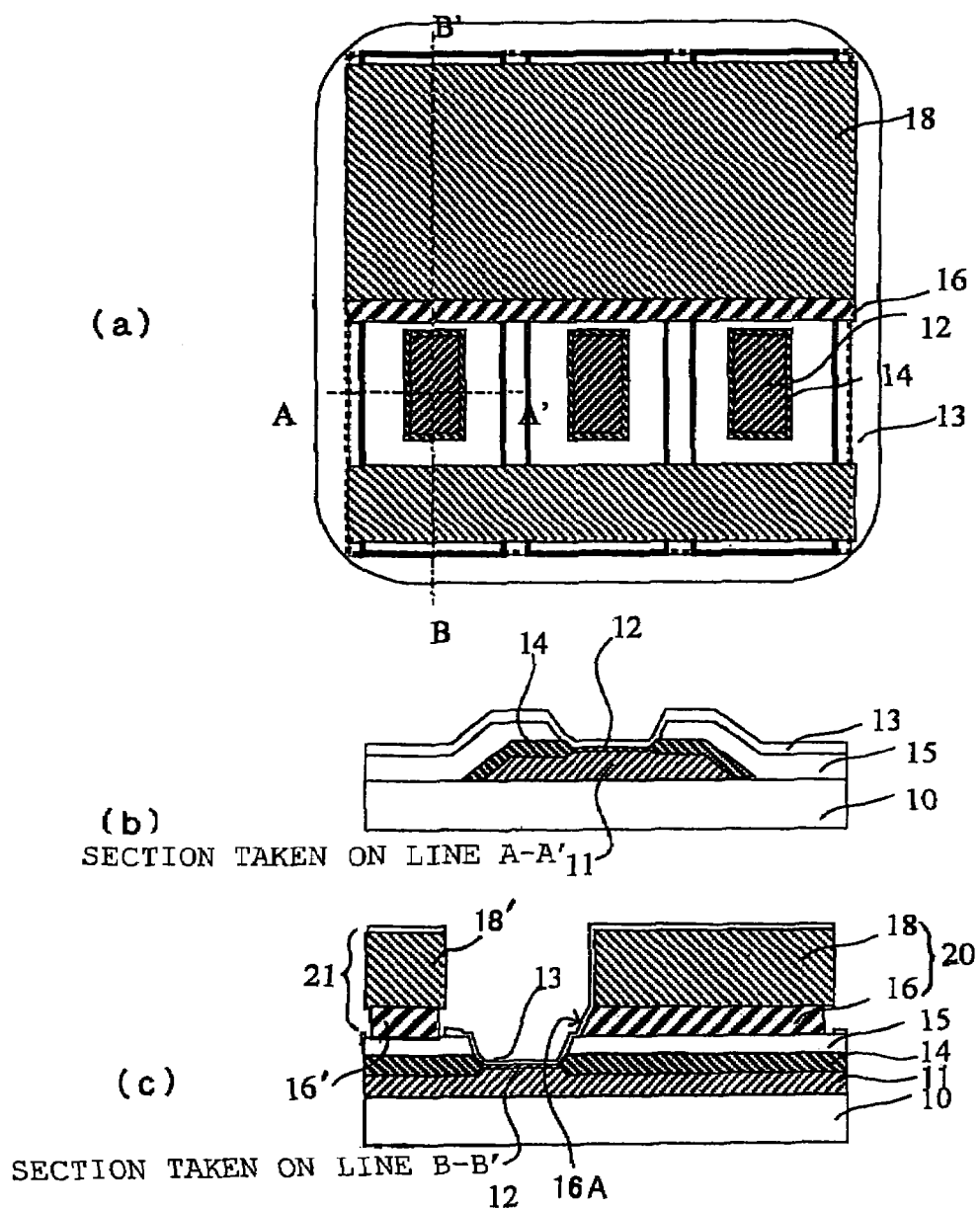
FIGS. 15A-15C are diagrams for explaining a step for manufacturing the MIM electron source forming one pixel in the second embodiment of the display device according to the present invention, the step following the step in FIGS. 14A-14C.

FIG. 11 is a partially enlarged schematic plan view for explaining the structure of the first embodiment of the display device according to the present invention. Incidentally, parts having the same functions as those in FIG. 1 and FIGS. 2A-2C to 10A-10C are denoted by the same reference numerals correspondingly. This display device is constituted by a display panel in which a cathode-side substrate 10 (hereinafter also referred to as "cathode substrate 10") and a display-side substrate 100 (hereinafter also referred to as "fluorescent screen substrate 100") are laminated to each other (the same thing is applied to the following embodiments). Incidentally, in FIG. 11, the fluorescent screen substrate 100 is illustrated only partially in order to avoid complication, and parts of constituent members of the fluorescent screen formed in the internal surface of the fluorescent screen substrate 100 are shown on the cathode substrate 10. The fluorescent screen is formed out of red phosphor 111, green phosphor 112 and blue phosphor 113 sectioned by a black matrix 120 in order to increase the contrast. In addition, a film of an anode to which a high voltage of several kV is applied is formed in the internal surface of the fluorescent screen substrate 100. Incidentally, the anode is not shown in FIG. 11 (the same thing is applied to the following embodiments).

For example, $Y_2O_2S:Eu$(P22-R), $ZnS:Cu,Al$(P22-G) and $ZnS:Ag,Cl$ (P22-B) may be used as the red, green, and blue phosphors respectively for forming the fluorescent screen. The black matrix 120 is formed in the internal surface of the display-side substrate 100 so as to surround the circumference of each color phosphor to thereby separate the color phosphor from the other adjacent phosphors.

The cathode substrate 10 and the fluorescent screen substrate 100 are laminated to each other through high-strength spacers 30 for supporting the panel against the atmospheric pressure. Each of the spacers 30 is made of plate-like glass or ceramics given conductivity in order to prevent electrostatic charge. The spacers 30 are disposed on the metal film upper layer 18 forming the upper bus electrodes 20 of the cathode substrate 10, so as to be hidden under the black matrix 120 of the fluorescent screen substrate 100. The lower electrodes 11 are connected to a signal line circuit 50 for supplying display signals (display data) to pixels, and the upper bus electrodes 20 formed out of a laminated film of the metal film lower layer 16 and the metal film upper layer 18 are connected to a scanning line circuit 60 for supplying selection signals to the pixels. In each thin film type electron source configured thus, a voltage applied to a scanning line constituted by the upper bus electrode 20 is in a range of from several V to several tens V, which is sufficiently lower than the potential of the fluorescent screen to which a voltage of several kV is applied. Thus, potential substantially as low as the ground potential can be applied to the cathode side of each spacer 30. Accordingly, the upper bus electrode 20 made from a laminated film of the metal film lower layer 16 and the metal film upper layer 18 can be also used as a spacer electrode. In this embodiment, the upper bus electrode 20 is also used as a spacer electrode.

As is obvious from FIG. 11, in the circuit connection portion where connection is established between each lower electrode 11 and the signal line circuit 50 and between each upper bus electrode 20 and the scanning line circuit 60 outside the image display area corresponding to the area where the upper electrodes 13 are formed, the terminal pitch of each electrode typically differs from that in the image display area. Since there is no electron source in the circuit connection portion, pattern matching is not necessary. Therefore, each electrode in the connection portion does not have to have a stripe shape. Thus, the electrode in the connection portion can be processed in a printing method with low patterning accuracy, and typically does not have to be formed into a stripe shape.

In addition, as is obvious from FIG. 11, each thin film type electron source in an end portion of the image display area, that is, each thin film type electron source in the upper end row in FIG. 11 in this embodiment has no adjacent pixel on the upper side. Thus, pixel separation using two stripe electrodes is not required.

In such a manner, in the cathode structure of the display device according to this embodiment, each of the lower electrodes 11 serving as signal lines (data lines) and the upper bus electrodes 20 (laminated film of the metal film lower layer 16 and the metal film upper layer 18) serving as both scanning lines and spacer electrodes is formed out of one simple stripe electrode in one sub-pixel within the image display area. Further, the cathode structure has a function capable of separating the upper electrodes 13 by self-alignment. Thus, the electrodes can be formed even by use of an inexpensive and low-accuracy patterning method such as a printing method.

Second Embodiment

Figure 16:
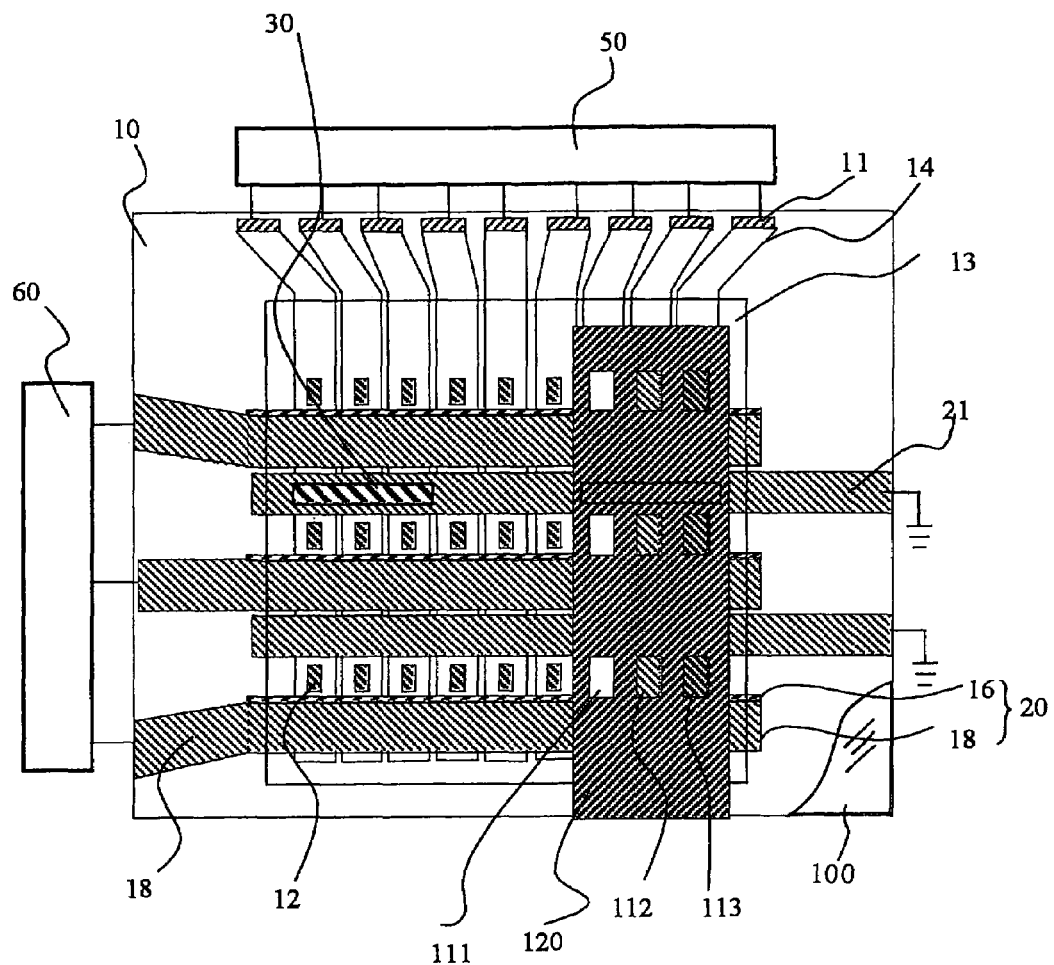
FIG. 16 is a partially enlarged schematic plan view for explaining the structure of the second embodiment of the display device according to the present invention.
Figure 17:
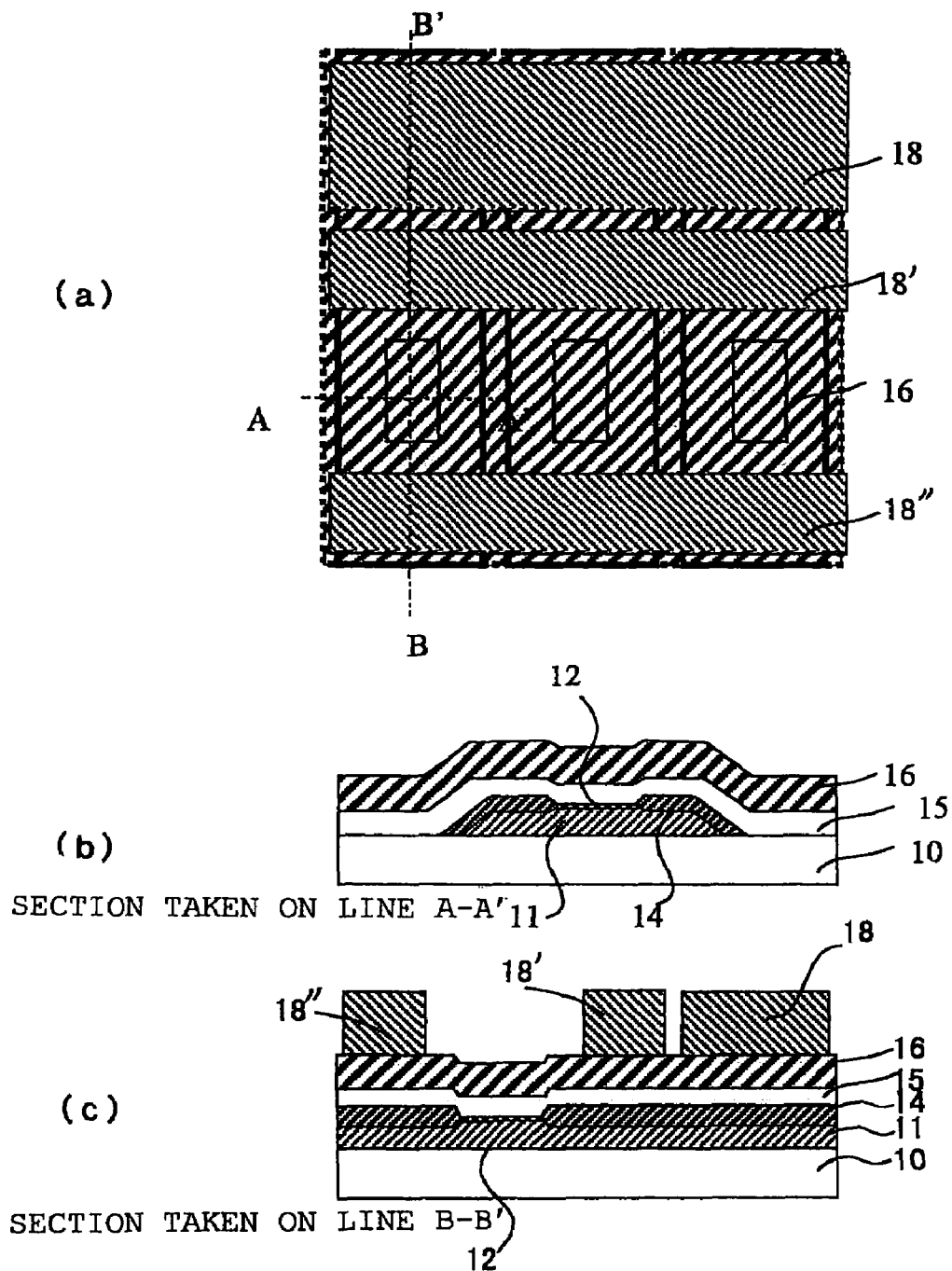
FIGS. 17A-17C are diagrams for explaining a step for manufacturing an MIM electron source forming one pixel in a third embodiment of the display device according to the present invention.

Next, a second embodiment of the present invention using MIM electron sources by way of example will be described with reference to FIGS. 2A-2C to 6A-6C, FIGS. 12A-12C to 15A-15C and FIG. 16. FIGS. 12A-12C to 15A-15C are diagrams for explaining steps for manufacturing an MIM electron source forming one picture element in the second embodiment of the display device according to the present invention. The steps are shown in turn along FIGS. 2A-2C to FIGS. 6A-6C and FIGS. 12A-12C to 15A-15C. FIGS. 12A-15A are plan views of one picture element. FIGS. 12B-15B are sectional views taken on line A-A' in FIGS. 12A-15A respectively. FIGS. 12C-15C are sectional views taken on line B-B' in FIGS. 12A-15A respectively. In addition, FIG. 16 is a partially enlarged schematic plan view for explaining the structure of the second embodiment of the display device according to the present invention. Incidentally, parts having the same functions as those in the drawings of the aforementioned embodiment are denoted by the same reference numerals correspondingly.

First, a lower electrode 11, a protective insulating layer 14 and an insulating layer 12 are formed and an interlayer film 15, a metal film lower layer 16 and a metal film upper layer 18 (18') are formed thereon in the same manner as the steps shown in FIGS. 2A-2C to 6A-6C in the description of the first embodiment. Subsequently, the metal film upper layer 18 (18') of an upper bus electrode 20 is processed into stripe electrodes crossing the lower electrode 11 by patterning of resist using screen printing and an etching process. Thus, two stripe electrodes are formed in one pixel (FIGS. 12A-12C).

Subsequently, the metal film lower layer 16 of the upper bus electrode 20 is processed into stripe electrodes (metal film lower layers 16 and 16') crossing the lower electrode 11 by patterning of resist using screen printing and an etching process (FIGS. 13A-13C). At that time, as shown in FIG. 13C, the position of a resist film 26 printed is shifted in parallel with the stripe electrode of the metal film upper layer 18 formed in FIGS. 12A-12C, so that the resist film 26 projects from the metal film upper layer 18 on the insulating layer 12 side (left side in FIG. 13C) so as to form a projecting portion 26A on one (metal film lower layer 16) of the stripe electrodes. Due to the projecting portion 26A, a contact portion 16A for securing connection between the upper electrode 13 and the metal film lower layer 16 as will be formed in a subsequent step and as will be described with reference to FIGS. 15A-15C is formed in the metal film lower layer 16.

On the opposite side (right side in FIG. 13C) to the insulating layer 12, an appentice 18A is formed in the metal film upper layer 18 so as to serve as a mask with which the metal film lower layer 16 is set back by over-etching. A setback portion 16B formed thus in the metal film lower layer 16 serves to separate an upper electrode 13 which will be formed by sputtering in a subsequent step. Thus, an upper bus electrode 20 (a laminated film of the metal film lower layer 16 and the metal film upper layer 18) for feeding power to the upper electrode 13 can be formed in each pixel. On the other hand, in the other metal film upper layer 18' serving as a stripe electrode disposed on the left side of FIG. 13C, the metal film lower layer 16' is over-etched both on the insulating layer 12 side and on the opposite side thereto. Thus, the metal film lower layer 16' is set back so that an appentice is formed on each side of the metal film upper layer 18'. This appentice serves as a mask for separating the upper electrode 13 which will be formed by sputtering in a subsequent step as will be described later with reference to FIGS. 15A-15C. Incidentally, this electrode (upper bus electrode 20 constituted by the metal film lower electrode 16' and the metal film upper portion 18') finally serves as a spacer electrode 21 (FIG. 16) on which the spacers 30 are disposed.

Subsequently, the interlayer film 15 is processed to open electron emission portions. Each electron emission portion is formed in a part of a crossing portion of the space surrounded by one lower electrode 11 in that pixel and two stripe-shaped electrodes (the upper bus electrode 20 constituted by the metal film lower layer 16 and the metal film upper layer 18 and the spacer electrode 21 constituted by the metal film lower layer 16' and the metal film upper layer 18') crossing the lower electrode 11. The processing of opening the electron emission portions can be performed by dry etching using etching gas, for example, having $CF_4$ or $SF_6$ as a chief component (FIGS. 14A-14C).

Finally, a film of the upper electrode 13 shown in FIGS. 15A-15C is formed. A sputtering method is used for forming the film by way of example. For example, a laminated film of Ir, Pt and Au is used for the film of the upper electrode 13, and the thickness of the film is set at 6 nm. In this event, the upper electrode 13 is cut by the appentices of the metal film upper layers 18 and 18' of the two stripe electrodes (the upper bus electrode 20 and the spacer electrode 21), so as to be separated in accordance with each pixel. On the other hand, on the insulating layer 12 side of the upper bus electrode 20, the film serving as the upper electrode 13 is connected without disconnection due to the contact portion 16A of the metal film lower layer 16. Thus, a structure to feed power over the interlayer film 15 and the insulating layer 12 is arranged.

FIG. 16 is a partially enlarged schematic plan view for explaining the structure of the second embodiment of the display device according to the present invention. A fluorescent screen made from a black matrix 120 for increasing the contrast, red phosphor 111, green phosphor 112 and blue phosphor 113 is formed in the internal surface of a fluorescent screen substrate 100. For example, $Y_2O_2S:Eu(P22-R)$, $ZnS:Cu,Al(P22-G)$ and $ZnS:Ag,Cl(P22-B)$ may be used as the red, green and blue phosphors respectively for forming the fluorescent screen. The black matrix 120 is formed in the internal surface of the display-side substrate 100 so as to surround the circumference of each color phosphor to thereby separate the color phosphor from the other adjacent phosphors. In addition, a film of an anode to which a high voltage of several kV is applied is formed in the internal surface of the fluorescent screen substrate 100.

The spacers 30 are disposed on the spacer electrode 21 of the cathode substrate 10 so as to be hidden under the black matrix 120 of the fluorescent screen substrate 100. Each lower electrode 11 is connected to a signal line circuit 50, and each upper bus electrode 20 (laminated film of the metal film lower layer 16 and the metal film upper layer 18) is connected to a scanning line circuit 60. Each laminated film of the metal film lower layer 16' and the metal film upper layer 18' serves as a spacer electrode 21, which is typically grounded.

As is obvious from FIG. 16, in the circuit connection portion where connection is established between each lower electrode 11 and the signal line circuit 50 and between each upper bus electrode 20 and the scanning line circuit 60 outside the image display area corresponding to the area where the upper electrodes 13 are formed, the terminal pitch of each electrode typically differs from that in the image display area. Since there is no electron source in the circuit connection portion, pattern matching is not necessary. Therefore, each electrode in the connection portion does not have to have a stripe shape. Thus, the electrode in the connection portion can be processed in a printing method with low patterning accuracy, and typically does not have to be formed into a stripe shape.

In addition, as is obvious from FIG. 16, each thin film type electron source in an end portion of the image display area, that is, each thin film type electron source in the upper end row in FIG. 16 in this embodiment has no adjacent pixel on the upper side. Thus, pixel separation using two stripe electrodes is not required.

In such a manner, in the cathode structure of the display device according to this embodiment, each of the lower electrodes 11 serving as signal lines (data lines), the upper bus electrodes 20 (laminated film of the metal film lower layer 16 and the metal film upper layer 18) serving as scanning lines, and the spacer electrodes 21 (laminated film of the metal film lower layer 16' and the metal film upper layer 18') is formed as one simple stripe electrode. Further, the cathode structure has a function capable of separating the upper electrodes 13 by self-alignment. Thus, the electrodes can be formed even by use of an inexpensive and low-accuracy patterning method such as a printing method.

Third Embodiment

Figure 21:
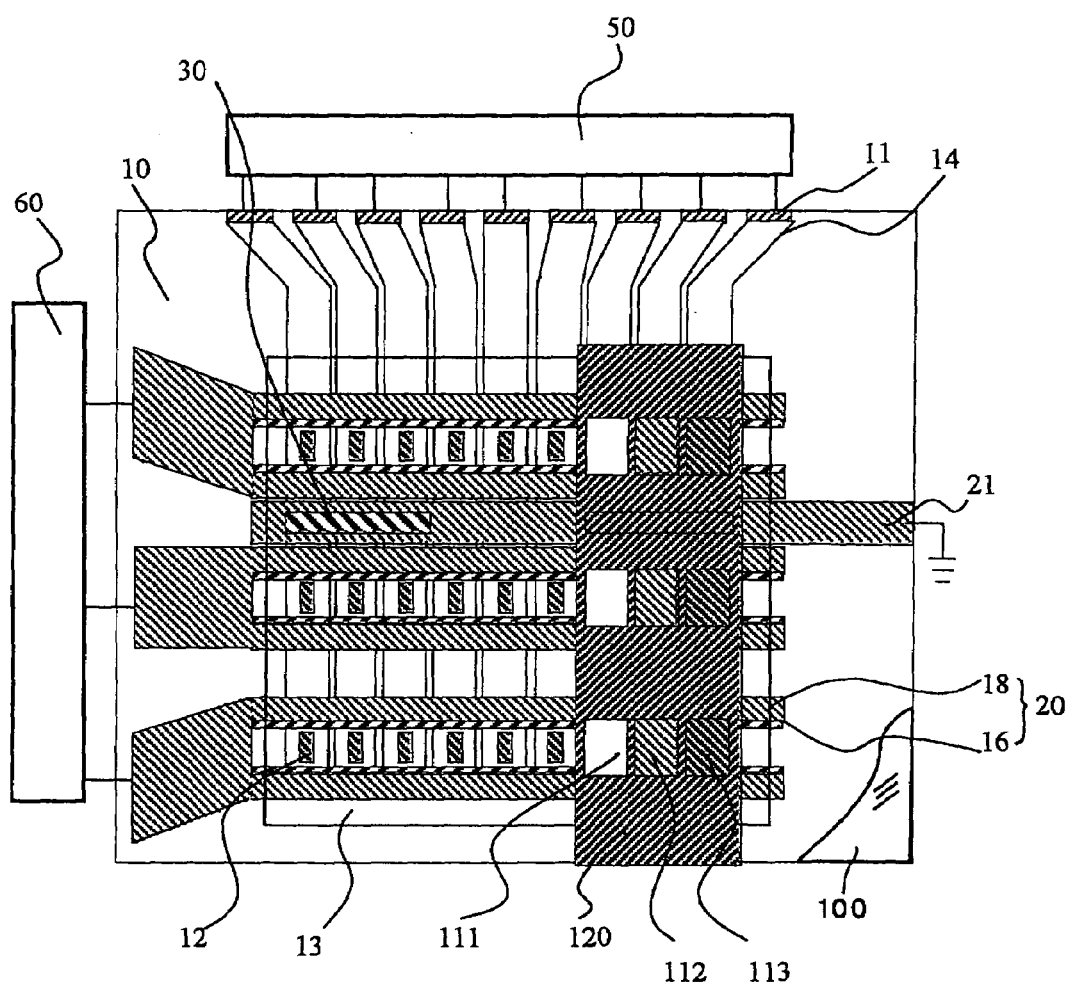
FIG. 21 is a partially enlarged schematic plan view for explaining the structure of the third embodiment of the display device according to the present invention.
Figure 22:
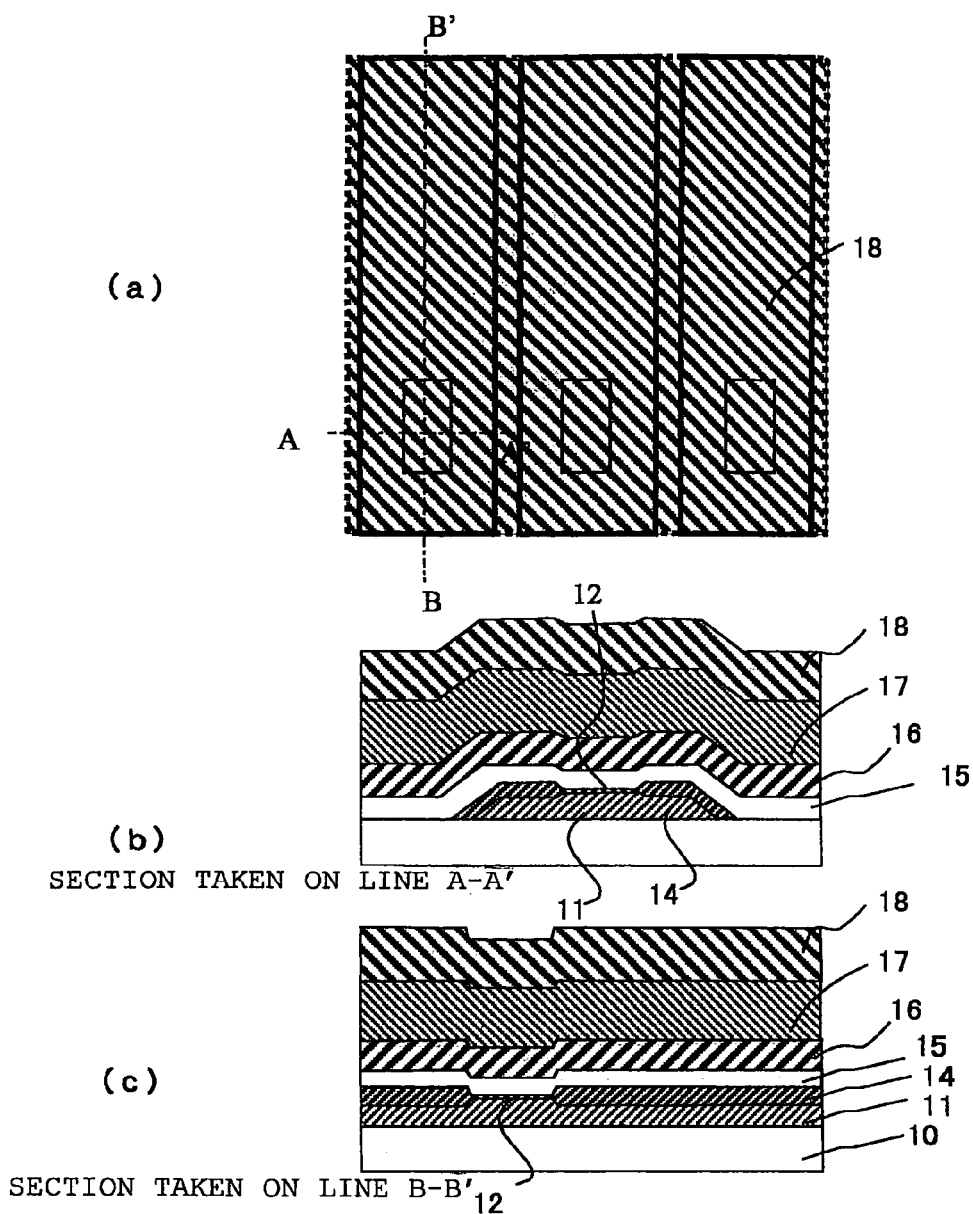
FIGS. 22A-22C are diagrams for explaining a step for manufacturing an MIM electron source forming one pixel in a fourth embodiment of the display device according to the present invention.
Figure 23:
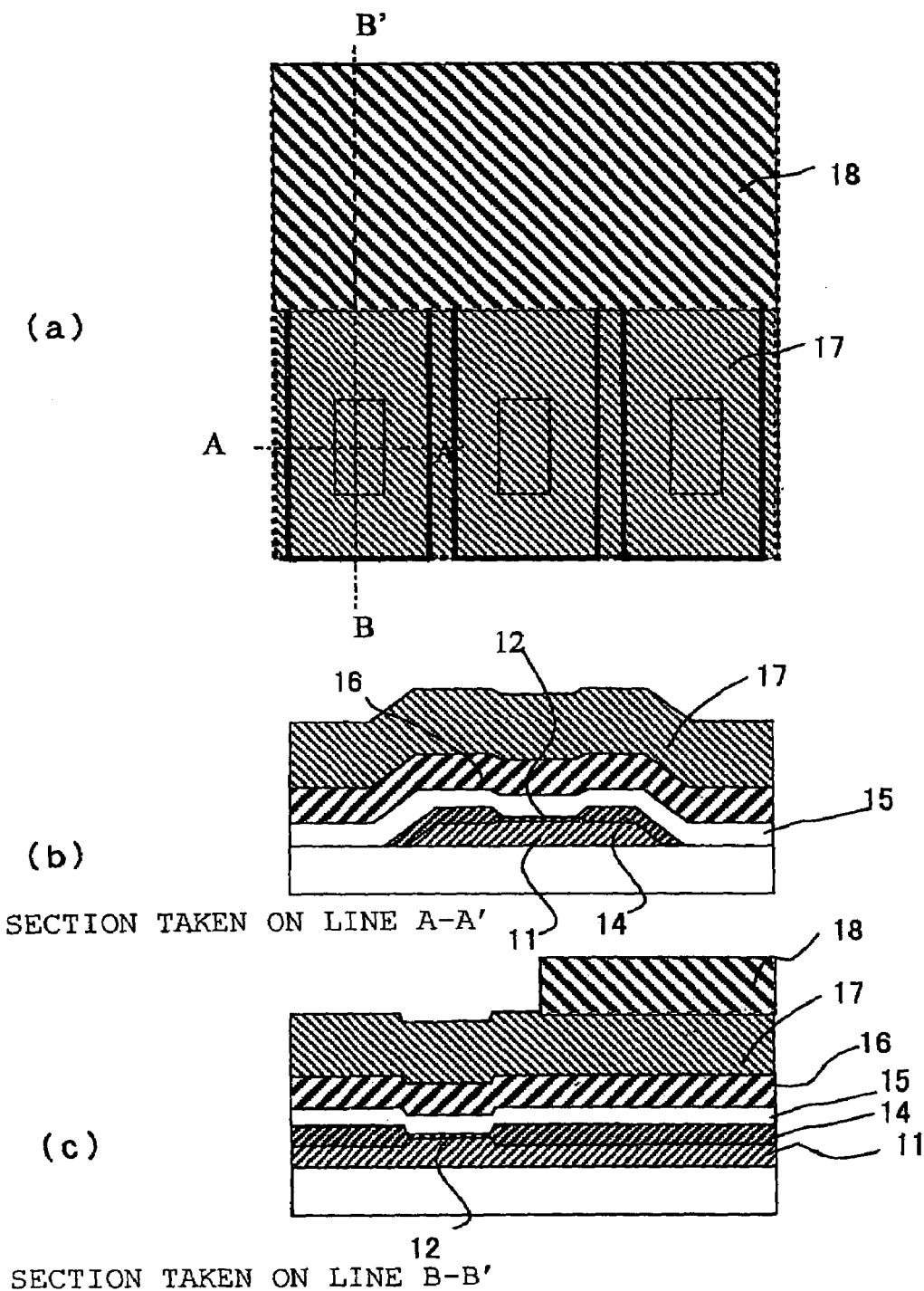
FIGS. 23A-23C are diagrams for explaining a step for manufacturing the MIM electron source forming one pixel in the fourth embodiment of the display device according to the present invention, the step following the step in FIGS. 22A-22C.
Figure 24:
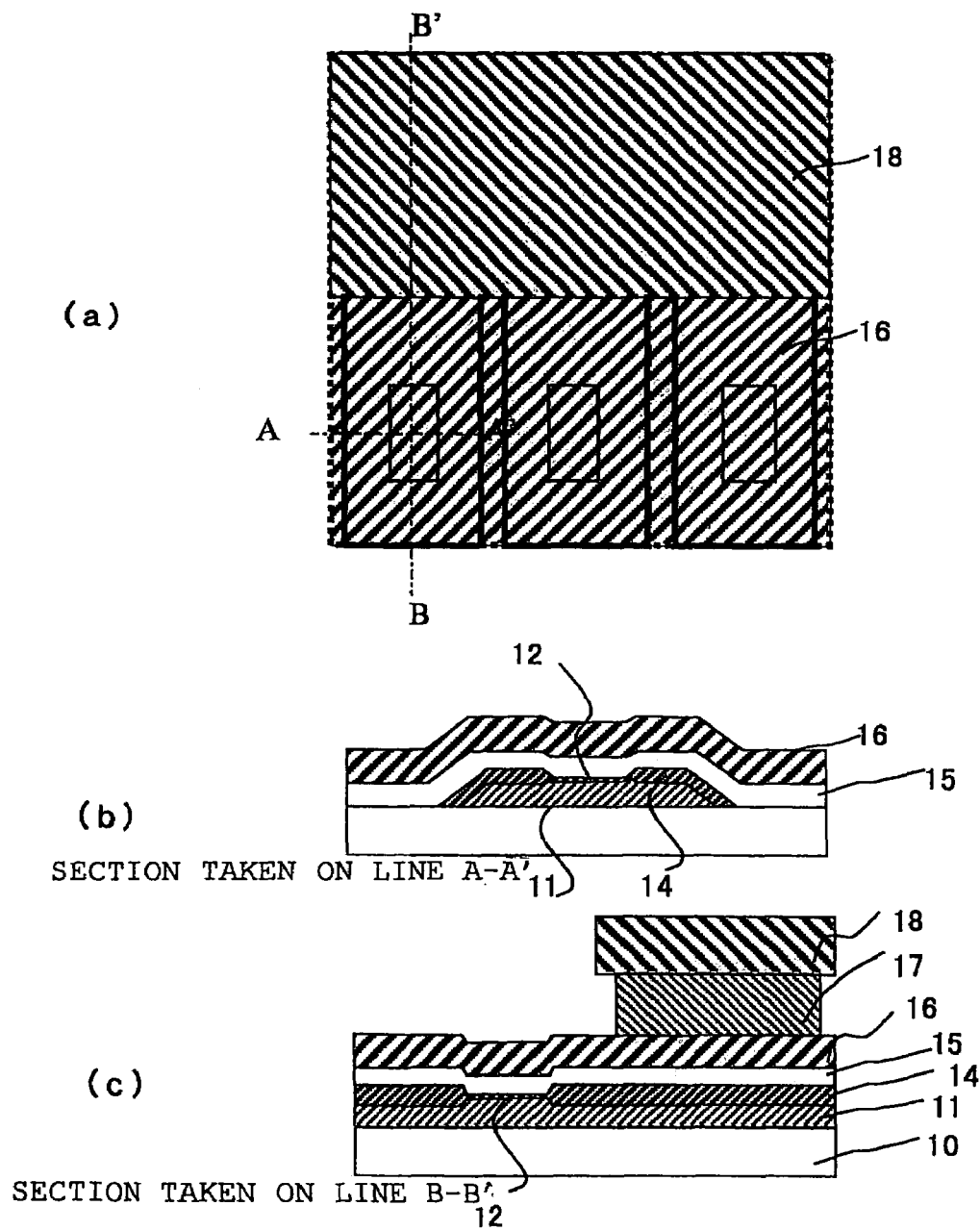
FIGS. 24A-24C are diagrams for explaining a step for manufacturing the MIM electron source forming one pixel in the fourth embodiment of the display device according to the present invention, the step following the step in FIGS. 23A-23C.
Figure 26:
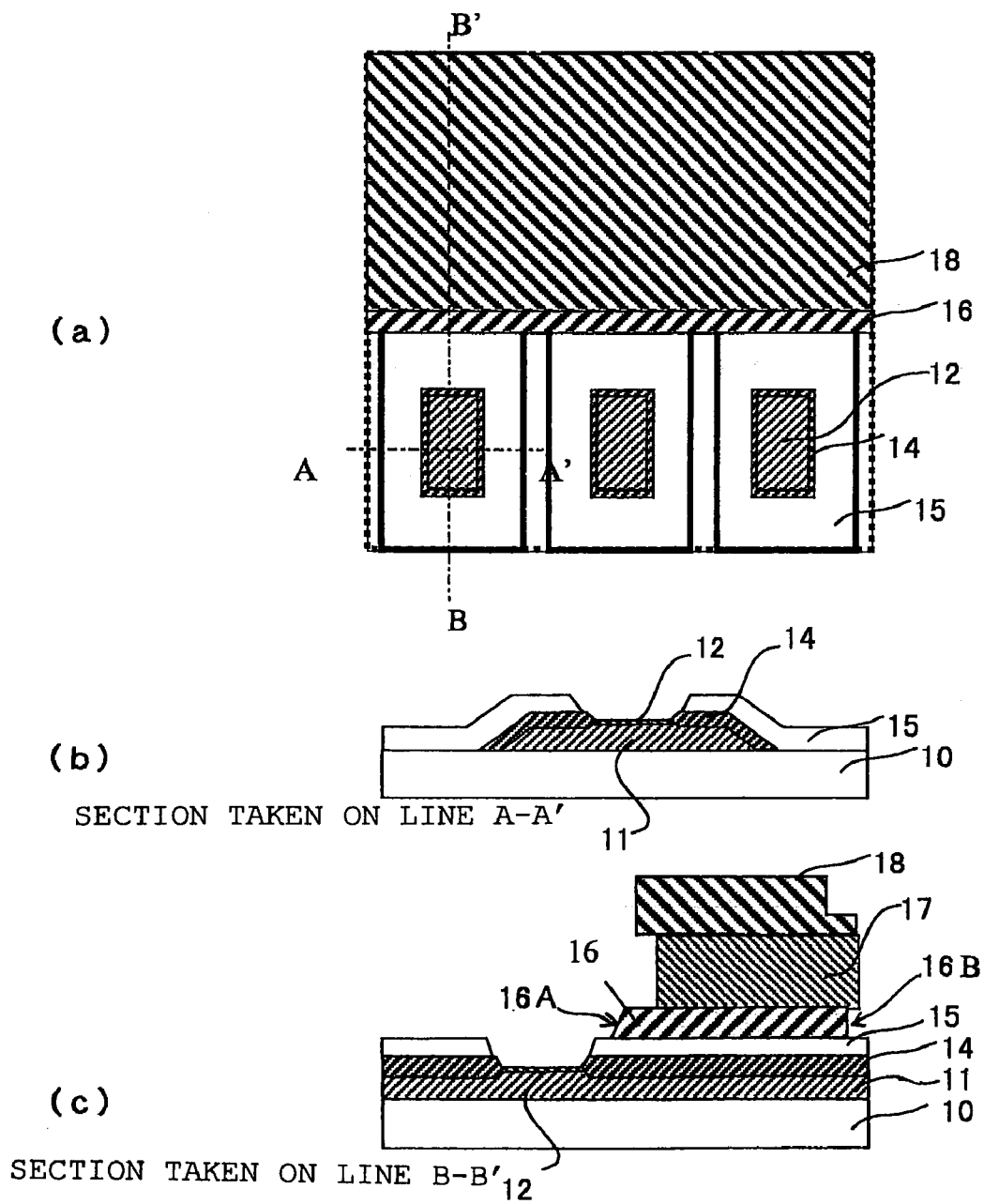
FIGS. 26A-26C are diagrams for explaining a step for manufacturing the MIM electron source forming one pixel in the fourth embodiment of the display device according to the present invention, the step following the step in FIGS. 25A-25C.

Next, a third embodiment of the display device according to the present invention using MIM electron sources by way of example will be described with reference to FIGS. 2A-2C to 6A-6C, FIGS. 17A-17C to 20A-20C and FIG. 21. FIGS. 17A-17C to 20A-20C are diagrams for explaining steps for manufacturing an MIM electron source forming one picture element in the third embodiment of the display device according to the present invention. FIGS. 17A-20A are plan views of one picture element. FIGS. 17B-20B are sectional views taken on line A-A' in FIGS. 17A-20A respectively. FIGS. 17C-20C are sectional views taken on line B-B' in FIGS. 17A-20A respectively. In addition, FIG. 21 is a partially enlarged schematic plan view for explaining the structure of the third embodiment of the display device according to the present invention. Incidentally, parts having the same functions as those in the drawings of the aforementioned embodiments are denoted by the same reference numerals correspondingly.

First, a lower electrode 11, a protective insulating layer 14 and an insulating layer 12 are formed and an interlayer film 15, a metal film lower layer 16 and a metal film upper layer 18 are formed thereon in the same manner as the steps shown in FIGS. 2A-2C to 6A-6C in the first embodiment.

Subsequently, the metal film upper layer 18 is processed into stripe electrodes crossing the lower electrode 11 by patterning of resist using screen printing and an etching process. Thus, three stripe electrodes (metal film upper layers 18, 18' and 18") are formed in one pixel (FIGS. 17A-17C).

Next, the metal film lower layer 16 is formed into stripe electrodes (metal film lower layers 16, 16' and 16") crossing the lower electrode 11 by patterning of resist using screen printing and an etching process (FIGS. 18A-18C). At that time, in the same manner as in the aforementioned embodiments, the positions of resist films 26 and 26' printed are shifted in parallel with the stripe electrodes of the metal film upper layers 18' and 18" formed in FIGS. 17A-17C, so that the resist films 26 and 26' project from the metal film upper layers 18' and 18" on the insulating layer 12 side respectively so as to form projecting portions on two stripe electrodes (metal film lower layers 16' and 16") having an insulating layer 12 put therebetween. Each projecting portion will serve as a contact portion for securing connection with an upper electrode 13 in a subsequent step.

The insulating layer 12 is put between the metal film lower layers 16' and 16". On the other side of the metal film lower layer 16', 16" opposite to the insulating layer 12, an appentice is formed with the metal film upper layer 18', 18" as a mask so as to serve as a mask with which the metal film lower layer 16', 16" will be over-etched to separate the upper electrode 13 in a subsequent step. Thus, two upper bus electrodes (a laminated film of the metal film lower layer 16' and the metal film upper layer 18' and a laminated film of the metal film lower layer 16" and the metal film upper layer 18") for feeding power to the upper electrode 13 can be formed. On the other hand, an appentice is formed on each side of the other stripe electrode (a laminated film of the metal film lower layer 16 and the metal film upper layer 18) with the metal film upper layer 18 as a mask so as to serve as a mask for separating the upper electrode 13. This electrode finally serves as a spacer electrode 21 on which spacers are disposed.

Subsequently, the interlayer film 15 is processed to open electron emission portions (FIGS. 19A-19C). Each electron emission portion is formed in a part of a crossing portion of the space surrounded by one lower electrode 11 in that pixel and two stripe-shaped electrodes (one is a laminated film of the metal film lower layer 16' and the metal film upper layer 18' and the other is a laminated film of the metal film lower layer 16" and the metal film upper layer 18") crossing the lower electrode 11 and forming contact portions 16'A and 16"A. Etching the interlayer film 15 to thereby open the electron emission portions can be performed by dry etching using etching gas, for example, having $CF_4$ or $SF_6$ as a chief component.

Finally, a film of the upper electrode 13 is formed as shown in FIGS. 20A-20C. A sputtering method is used for forming the film by way of example. For example, a laminated film of Ir, Pt and Au is used as the film of the upper electrode 13, and the thickness of the film is set at 6 nm. In this event, the upper electrode 13 is cut by the appentices in the outside of the two upper bus electrodes (the laminated film of the metal film lower layer 16' and the metal film upper layer 18' and the laminated film of the metal film lower layer 16" and the metal film upper layer 18") having the contact portions 16'A and 16"A formed therein respectively as shown in FIGS. 19A-19C, and by the appentice on each side of the spacer electrode 21 (the laminated film of the metal film lower layer 16 and the metal film upper layer 18) so as to be separated in accordance with each pixel. On the other hand, on the insulating layer 12 side, the film serving as the upper electrode 13 is connected without disconnection due to the contact portions 16'A and 16"A of the metal film lower layers 16' and 16". Thus, a structure to feed power over the interlayer film 15 and the insulating layer 12 is arranged.

FIG. 21 is a partially enlarged schematic plan view for explaining the structure of the third embodiment of the display device according to the present invention. A fluorescent screen made from a black matrix 120 for increasing the contrast, red phosphor 111, green phosphor 112 and blue phosphor 113 is formed in the internal surface of a fluorescent screen substrate 100. For example, $Y_2O_2S$:Eu(P22-R), ZnS:Cu,Al(P22-G) and ZnS:Ag,Cl(P22-B) may be used as the red, green, and blue phosphors respectively for forming the fluorescent screen. The black matrix 120 is formed in the internal surface of the display-side substrate 100 so as to surround the circumference of each color phosphor to thereby separate the color phosphor from the other adjacent phosphors. In addition, a film of an anode to which a high voltage of several kV is applied is formed in the internal surface of the fluorescent screen substrate 100.

This embodiment is different from the first embodiment in that each electron release portion is not close to the spacer electrode 21 constituted by the metal film lower layer 16 and the metal film upper layer 18. Accordingly, it is easy to position the spacer 30, and it is also easy to increase the open area ratio of each phosphor. Further, an enough distance can be secured between the spacer 30 and the thin film type electron source. Thus, there is an advantage that the electron inflow to the spacer 30 is reduced so that the spacer 30 becomes difficult to charge.

The lower electrodes 11 are connected to a signal line circuit 50, and the upper bus electrodes (a laminated film of the metal film lower layer 16' and the metal film upper layer 18' and a laminated film of the metal film lower layer 16" and the metal film upper layer 18") are connected to a scanning line circuit 60. The spacer electrode 21 comprised of a laminated film of the metal film lower layer 16 and the metal film upper layer 18 is typically grounded.

As is obvious from FIG. 21, in the circuit connection portion outside the image display area corresponding to the area where the upper electrodes 13 are formed, the terminal pitch of each electrode typically differs from that in the image display area. Since there is no electron source in the circuit connection portion, pattern matching is not necessary. Therefore, each electrode in the connection portion does not have to have a stripe shape. Thus, the electrode in the connection portion can be processed in a printing method with low patterning accuracy, and typically does not have to be formed into a stripe shape.

In such a manner, in the cathode structure according to this embodiment, each of the lower electrodes 11, the upper bus electrodes 20 and the spacer electrode 21 is formed as one simple stripe electrode. Further, the cathode structure has a function capable of separating the upper electrodes 13 by self-alignment. Thus, the electrodes can be formed even by use of an inexpensive and low-accuracy patterning method such as a printing method. Further, the cathode structure is advantageous in view of the positioning of the spacers 30 and the increased open area ratio of the fluorescent screen.

Fourth Embodiment

Figure 28:
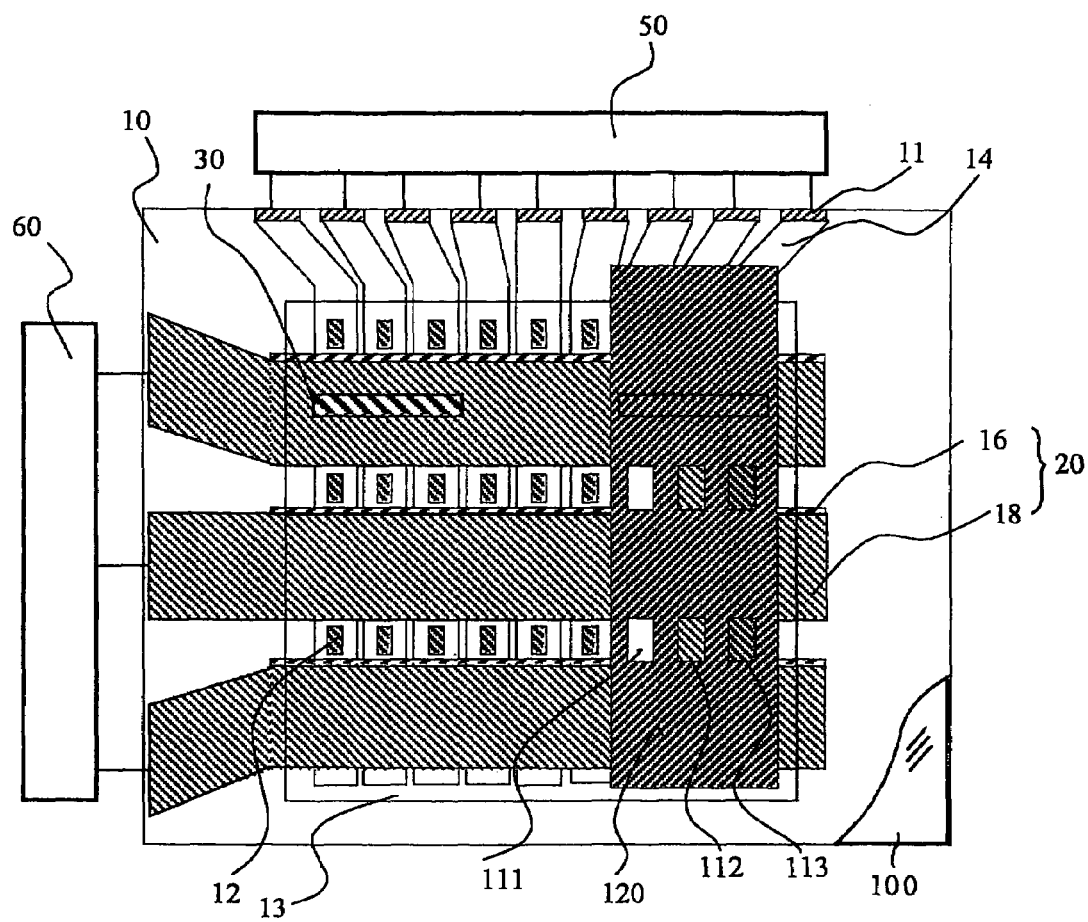
FIG. 28 is a partially enlarged schematic plan view for explaining the structure of the fourth embodiment of the display device according to the present invention.

Next, a fourth embodiment of the present invention using MIM electron sources by way of example will be described with reference to FIGS. 2A-2C to 5A-5C, FIGS. 22A-22C to 27A-27C and FIG. 28. FIGS. 22A-22C to 27A-27C are diagrams for explaining steps for manufacturing an MIM electron source forming one picture element in the fourth embodiment of the present invention. FIGS. 22A-27A are plan views of one picture element. FIGS. 22B-27B are sectional views taken on line A-A' in FIGS. 22A-27A respectively. FIGS. 22C-27C are sectional views taken on line B-B' in FIGS. 22A-27A respectively. In addition, FIG. 28 is a partially enlarged schematic plan view for explaining the structure of the fourth embodiment of the display device according to the present invention. Incidentally, parts having the same functions as those in the drawings of the aforementioned embodiments are denoted by the same reference numerals correspondingly.

First, a lower electrode 11, a protective insulating layer 14 and an insulating layer 12 are formed in the same manner as the steps shown in FIGS. 2A-2C to 5A-5C in the first embodiment. Next, as shown in FIGS. 22A-22C, an interlayer film 15 and a metal film are formed, for example, in a sputtering method or the like. The metal film serves as an upper bus electrode which will be a power feeder to upper electrodes 13 and a spacer electrode on which spacers will be disposed. For example, a silicon oxide film, a silicon nitride film, a silicon film or the like may be used as the interlayer film 15. In this embodiment, a silicon nitride film is used, and the film thickness is set at 100 nm. The interlayer film 15 serves to fill up possible pinholes in the protective insulating layer 14 formed by anodization, so as to secure insulation between each lower electrode 11 and each upper bus electrode.

In this embodiment, the upper bus electrode is formed as a three-layer laminated film in which Cu as a metal film intermediate layer 17 is inserted between a metal film lower layer 16 and a metal film upper layer 18. The laminated film is not limited to such a three-layer laminated film, but may include four or more layers. A metal material high in oxidation resistance, such as Al, chromium (Cr), tungsten (W) or molybdenum (Mo), an alloy containing those materials, or a laminated film of those materials may be used for the metal film lower layer 16 and the metal film upper layer 18. Incidentally, in this embodiment, an Al—Nd alloy is used for the metal film lower layer 16 and the metal film upper layer 18. Alternatively, a five-layer film using a laminated film of Cr, W, Mo or the like and an Al alloy as the metal film lower layer 16, a laminated film of Cr, W, Mo or the like and an Al alloy as the metal film upper layer 18, and high-melting metal for films in contact with Cu of the metal film intermediate layer 17 may be used. In this case, the high-melting metal serves as a barrier film in the heating step in the manufacturing process of the display device, so that alloying of Al and Cu can be suppressed. Thus, such a five-layer film is effective particularly in reducing in resistance.

When only the Al—Nd alloy is used, the film thickness of the Al—Nd alloy is set so that the metal film upper layer 18 is thicker than the metal film lower layer 16, and Cu of the metal film intermediate layer 17 is as thick as possible in order to reduce the wiring resistance thereof. In this embodiment, the thickness of the metal film lower layer 16 is set at 300 nm, the thickness of the metal film intermediate layer is set at 17, 4 μm, and the thickness of the metal film upper layer 18 is set at 450 nm. Incidentally, Cu of the metal film intermediate layer 17 may be formed by electroplating or the like as well as sputtering.

In the case of the five-layer film using high-melting metal, it is particularly effective that a laminated film in which Cu is inserted between pieces of Mo and which can be wet-etched with a mixed aqueous solution of phosphoric acid, acetic acid and nitric acid, is used as the metal film intermediate layer 17 in the same manner as Cu. In this case, each Mo film into which Cu is inserted is set to be 50 nm thick, and the Al alloy films as the metal film lower layer 16 and the metal film upper layer 18 having the metal film intermediate layer 17 put therebetween are set to be 300 nm thick and 50 nm thick respectively.

Subsequently, the metal film upper layer 18 is processed into a stripe shape crossing the lower electrode 11 by patterning of resist using screen printing and an etching process, as shown in FIGS. 23A-23C. In this etching process, for example, wet etching with a mixed aqueous solution of phosphoric acid and acetic acid is used. Since nitric acid is not added to the etchant, Cu is not etched but only the Al—Nd alloy can be selectively etched.

Also in the case of the five-layer film using Mo, when nitric acid is not added to the etchant, Mo and Cu is not etched but only the Al—Nd alloy can be selectively etched. In this embodiment, one piece of the metal film upper layer 18 is formed in each pixel in the same manner as in the first embodiment, but two pieces may be formed in the same manner as in the second embodiment.

Subsequently, using the same resist film as it is, or using the Al—Nd alloy of the metal film upper layer 18 as a mask, Cu of the metal film intermediate layer 17 is wet-etched, for example, with a mixed aqueous solution of phosphoric acid, acetic acid and nitric acid (FIGS. 24A-24C). The etching rate of Cu in the etchant of the mixed aqueous solution of phosphoric acid, acetic acid and nitric acid is much higher than that of the Al—Nd alloy. Thus, only Cu of the metal film intermediate layer 17 can be etched selectively. Also in the case of the five-layer film using Mo, the etching rate of Mo and Cu is much higher than that of the Al—Nd alloy. Thus, only the three-layer laminated film of Mo and Cu can be etched selectively. Alternatively, an ammonium persulfate aqueous solution or a sodium persulfate aqueous solution is also effective in etching Cu.

Subsequently, the metal film lower layer 16 is processed into a stripe shape crossing the lower electrode 11 by patterning of resist using screen printing and an etching process (FIGS. 25A-25C). The etching process is performed with a mixed aqueous solution of phosphoric acid and acetic acid. At that time, the position of a resist film 26 printed is shifted in parallel with the stripe electrode of the metal film upper layer 18 formed in FIGS. 23A-23C, so that the resulting metal film lower layer 16 projects from the metal film upper layer 18 on one side (left side of FIG. 25C) so as to form a contact portion 16A for securing connection with the upper electrode 13 in a subsequent step. On the other side (right side of FIG. 25C) of the metal film lower layer 16, over-etching is performed with the metal film upper layer 18 and the metal film intermediate layer 17 as a mask so as to set back the metal film lower layer 16 as if an appentice is formed in the metal film intermediate layer 17. Thus, a setback portion 16B is formed.

The appentice of the metal film intermediate layer 17 serves to separate the film of the upper electrode 13 formed in a subsequent step. At that time, since the metal film upper layer 18 is made thicker than the metal film lower layer 16, the metal film upper layer 18 can be left on Cu of the metal film intermediate layer 17 even after the etching of the metal film lower layer 16. Thus, the surface of Cu can be protected so that the oxidation resistance can be secured in spite of use of Cu, and the upper electrode 13 can be separated by self-alignment, while an upper bus electrode 20 for feeding power to the upper electrode 13 can be formed. In the case where the five-layer film having Cu put between pieces of Mo is used as the metal film intermediate layer 17, Mo can suppress the oxidization of Cu even if the Al alloy of the metal film upper layer 18 is thin. Thus, it is not always necessary to make the metal film upper layer 18 thicker than the metal film lower layer 16.

Subsequently, the interlayer film 15 is processed to open electron emission portions. Each electron emission portion is formed in a part of a crossing portion of the space surrounded by one lower electrode 11 in the pixel and two upper bus electrodes (one is a laminated film of the metal film lower layer 16, the metal film intermediate layer 17 and the metal film upper layer 18 and the other is a laminated film of the metal film lower layer 16, the metal film intermediate layer 17 and the metal film upper layer 18 in a not shown adjacent pixel) crossing the lower electrode 11. This etching can be performed by dry etching using etching gas, for example, having $CF_4$ or $SF_6$ as a chief component (FIGS. 26A-26C)

Finally, a film of the upper electrode 13 is formed. A sputtering method is used for forming the film in this embodiment. For example, a laminated film of Ir, Pt and Au is used as the film of the upper electrode 13, and the thickness of the film is set at 6 nm. In this event, the upper electrode 13 is cut by the setback portion 16B of the metal film lower layer 16 based on the appentice structure of the metal film intermediate layer 17 and the metal film upper layer 18 on one side (right side in FIG. 27C) of the two upper bus electrodes (the laminated film of the metal film lower layer 16, the metal film intermediate layer 17 and the metal film upper layer 18) having an electron emission portion put therebetween. On the other side (left side in FIG. 27C) of the two upper bus electrodes, the film serving as the upper electrode 13 is connected to the upper bus electrode (the laminated film of the metal film lower layer 16, the metal film intermediate layer 17 and the metal film upper layer 18) without disconnection due to the contact portion 16A of the metal film lower layer 16. Thus, a structure to feed power to the electron release portion is arranged (FIGS. 27A-27C).

FIG. 28 is a partially enlarged schematic plan view for explaining the structure of the fourth embodiment of the display device according to the present invention. In the same manner as in the aforementioned embodiments, a black matrix 120 for increasing the contrast, red phosphor 111, green phosphor 112 and blue phosphor 113 are formed in a fluorescent screen substrate 100. For example, $Y_2O_2S$:Eu(P22-R), ZnS:Cu,Al(P22-G) and ZnS:Ag,Cl(P22-B) may be used as the red, green and blue phosphors respectively. The black matrix 120 is formed in the internal surface of the display-side substrate 100 so as to surround the circumference of each color phosphor to thereby separate the color phosphor from the other adjacent phosphors. In order to avoid complication of the drawing, the black matrix and the phosphors of the respective colors are shown in only a part of the image display area. In addition, a film of an anode to which a high voltage of several kV is applied is formed in the internal surface of the fluorescent screen substrate 100.

The spacers 30 are disposed on the upper bus electrode 20 of the cathode substrate 10 so as to be hidden under the black matrix 120 of the fluorescent screen substrate 100. Each lower electrode 11 is connected to a signal line circuit 50, and each upper bus electrode 20 is connected to a scanning line circuit 60. In each thin film type electron source configured thus, a voltage applied to the upper bus electrode 20 serving as a scanning line is in a range of from several V to several tens V, which is sufficiently lower than a voltage of several kV to be applied to the anode of the fluorescent screen substrate 100. Thus, potential substantially as low as the ground potential can be applied to the anode side of each spacer 30.

As is obvious from FIG. 28, in the circuit connection portion outside the image display area corresponding to the area where the upper electrodes 13 are formed, the electrode terminal pitch of the lower electrodes 11 or the upper bus electrodes 20 typically differs from that in the image display area. Since there is no electron source in the circuit connection portion, pattern matching is not necessary. Therefore, each electrode terminal in the connection portion does not have to have a stripe shape. Thus, the electrode terminal in the connection portion can be processed in a printing method with a low patterning accuracy and typically does not have to have a stripe shape.

In addition, as is obvious from FIG. 28, each thin film type electron source in an end portion of the image display area (each thin film type electron source in the upper end row in FIG. 28 in this embodiment) has no adjacent pixel. Thus, pixel separation using two stripe electrodes as in the image display area is not required.

In such a manner, in the cathode structure forming the display device according to this embodiment, due to the structure of a laminated film in which low-resistance Cu wiring is put between pieces of an Al alloy, Cr or the like having oxidization resistance, the upper electrode 13 can be processed by self-alignment, and the upper bus electrode (laminated film of the metal film lower layer 16, and the metal film intermediate layer 17 and the metal film upper layer 18) prevented from deteriorating even in a sealing step can be produced. Thus, a voltage drop due to the wiring resistance of the display device can be suppressed. Particularly when a five-layer laminated film structure in which high-melting metal such as Mo is inserted between an Al alloy and Cu is used, alloying reaction between Al and Cu can be prevented so that the wiring resistance can be kept low specially.

In addition, due to the thick upper bus electrode (laminated film of the metal film lower layer 16, and the metal film intermediate layer 17 and the metal film upper layer 18), the thin film type electron sources can be prevented from being mechanically damaged by the spacers bearing the atmosphere.

Fifth Embodiment

Figure 29:
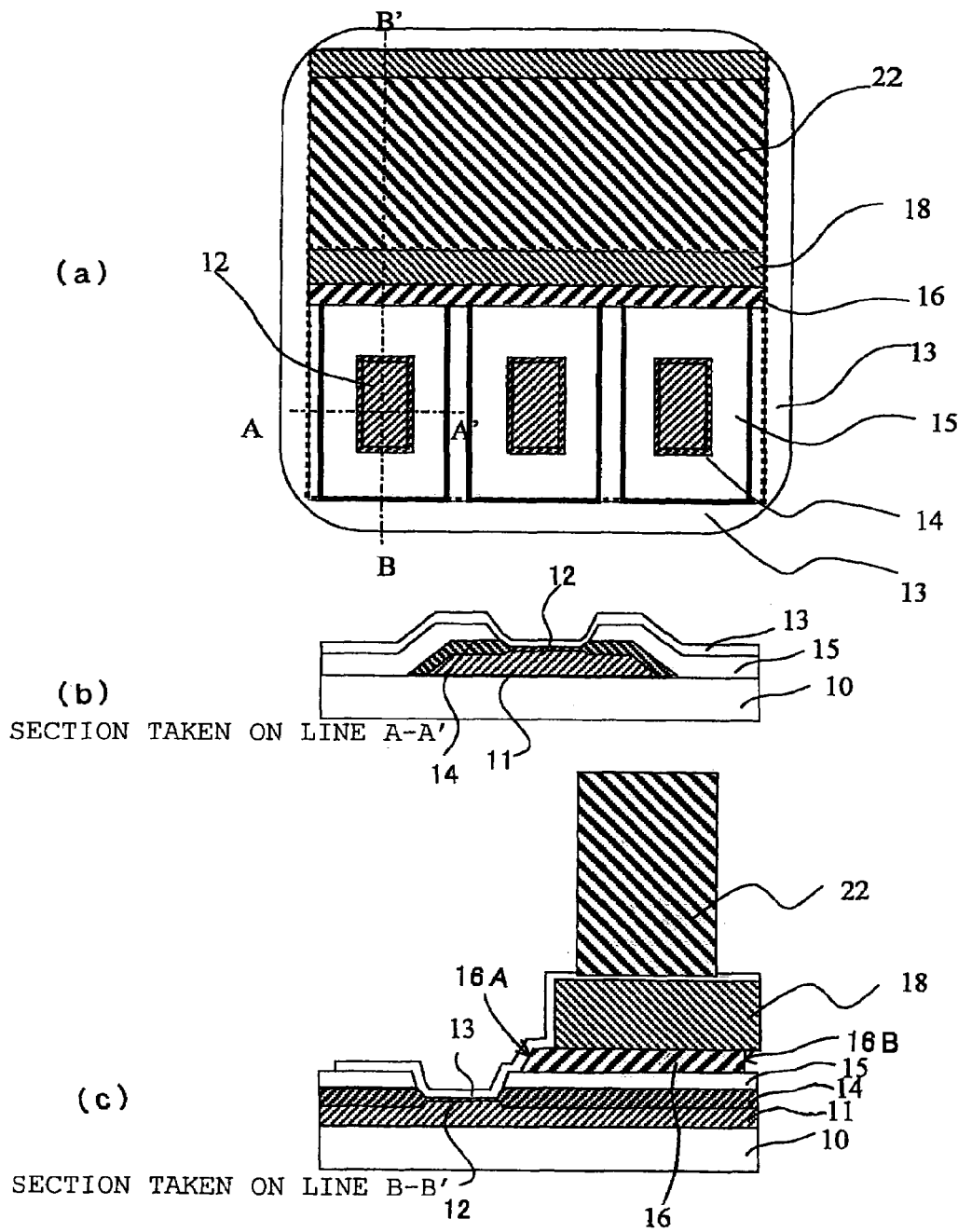
FIGS. 29A-29C are diagrams for explaining a step for manufacturing an MIM electron source forming one pixel in a fifth embodiment of the display device according to the present invention.
Figure 30:
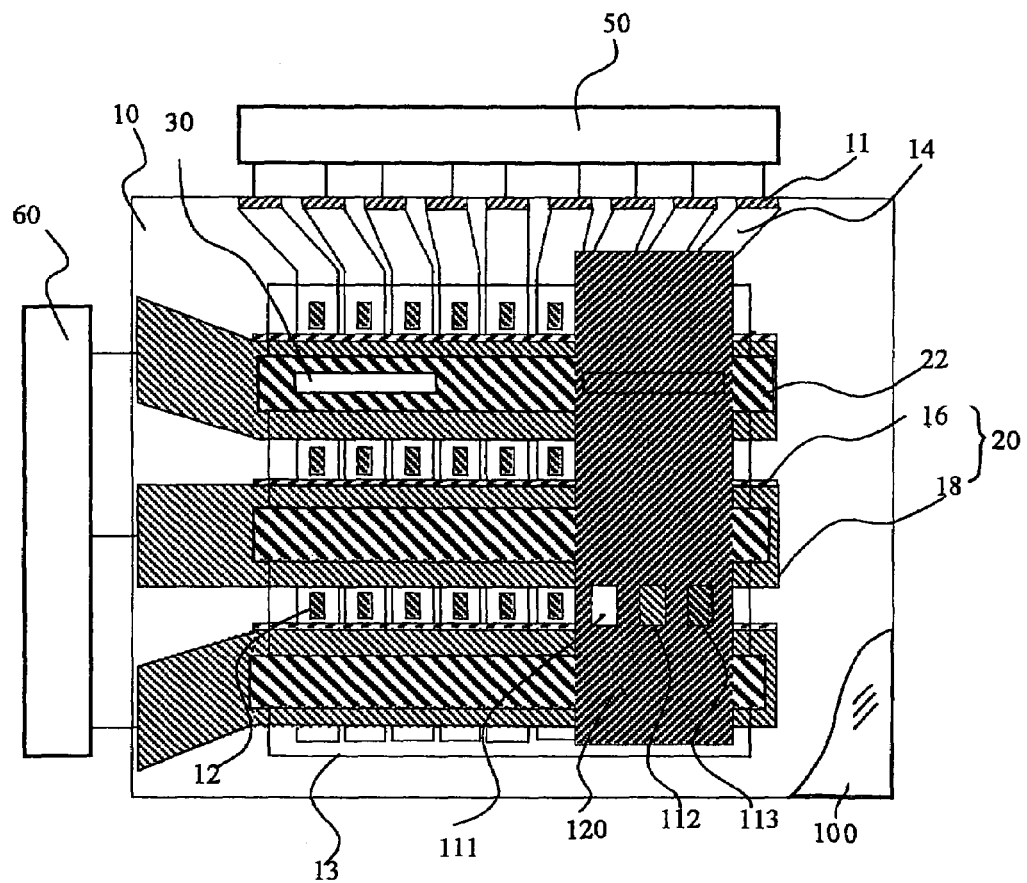
FIG. 30 is a partially enlarged schematic plan view for explaining the structure of the fifth embodiment of the display device according to the present invention.

Next, a fifth embodiment of the present invention using MIM electron sources by way of example will be described with reference to FIGS. 2A-2C to 5A-5C, FIGS. 22A-22C to 27A-27C, FIGS. 29A-29C and FIG. 30. FIGS. 29A-29C show a step for manufacturing an MIM electron source forming one picture element in the fifth embodiment of the display device according to the present invention. FIG. 29A is a plan view of one picture element. FIG. 29B is a sectional view taken on line A-A' in FIG. 29A. FIG. 29C is a sectional view taken on line B-B' in FIG. 29A. In addition, FIG. 30 is a partially enlarged schematic plan view for explaining the structure of the fifth embodiment of the display device according to the present invention. Incidentally, parts having the same functions as those in the drawings of the aforementioned embodiments are denoted by the same reference numerals correspondingly.

First, steps until forming the film of an upper electrode 13 are performed in the same manner as that in the description of FIGS. 2A-2C to 5A-5C and FIGS. 22A-22C to 27A-27C in the fourth embodiment. Subsequently, a paste containing a metal material such as silver (Ag) and a glass material is printed on an upper bus electrode (a laminated film of a metal film lower layer 16, a metal film intermediate layer 17 and a metal film upper layer 18) in a screen printing method, a dispenser method, an inkjet method or the like, so as to form a thick film electrode 22. The thick film electrode 22 can be made about 10-20 μm thick enough to reduce the wiring resistance and absorb the pressure from spacers. Further, the conductive properties of the thick film electrode 22 prevents the spacers from being charged, while the spacers can be fixed firmly by baking the glass contained in the thick film electrode 22. The thick film electrode 22 is baked in a high temperature process when sealing is secured between the thick film electrode 22 and the fluorescent screen substrate 100 after the thick film electrode 22 is dried. Thus, low resistance and bonding with the spacers are attained (FIGS. 29A-29C). The formation of the film of the upper electrode 13 is performed in the same manner as in the aforementioned embodiments.

FIG. 30 is a partially enlarged schematic plan view for explaining the structure of the fifth embodiment of the display device according to the present invention. In the same manner as in the aforementioned embodiments, a black matrix 120 for increasing the contrast, red phosphor 111, green phosphor 112 and blue phosphor 113 are formed in a fluorescent screen substrate 100. For example, $Y_2O_2S$: Eu(P22-R), ZnS:Cu,Al(P22-G) and ZnS:Ag,Cl(P22-B) may be used as the red, green and blue phosphors respectively.

The black matrix 120 is formed in the internal surface of the display-side substrate 100 so as to surround the circumference of each color phosphor to thereby separate the color phosphor from the other adjacent phosphors. In order to avoid complication of the drawing, the black matrix and the phosphors of the respective colors are shown in only a part of the image display area. In addition, a film of an anode to which a high voltage of several kV is applied is formed in the internal surface of the fluorescent screen substrate 100.

The spacers 30 are disposed on the thick film electrode 22 formed on the cathode substrate 10 so as to be hidden under the black matrix 120 formed in the fluorescent screen substrate 100. Each lower electrode 11 is connected to a signal line circuit 50, and each thick film electrode 22 is connected to a scanning line circuit 60. In each thin film type electron source configured thus, a voltage applied to the thick film electrode 22 serving as a scanning line is in a range of from several V to several tens V, which is sufficiently lower than a voltage of several kV to be applied to the anode of the fluorescent screen. Thus, potential substantially as low as the ground potential can be applied to the cathode side of each spacer.

As is obvious from FIG. 30, in the circuit connection portion outside the image display area corresponding to the area where the upper electrodes 13 are formed, the electrode terminal pitch of the lower electrodes 11 or the upper bus electrodes 20 typically differs from that in the image display area. Since there is no electron source in the circuit connection portion, pattern matching is not necessary. Therefore, each electrode terminal in the connection portion does not have to have a stripe shape. Thus, each electrode terminal in the connection portion can be processed in a printing method with a low patterning accuracy and typically does not have to have a stripe shape.

In addition, as is obvious from FIG. 30, each thin film type electron source in an end portion of the image display area (each thin film type electron source in the upper end row in FIG. 30 in this embodiment) has no adjacent pixel. Thus, pixel separation using two stripe electrodes as in the inside of the image display area is not required.

In such a manner, in the cathode structure forming the display device according to this embodiment, due to the thick film paste of Ag or the like printed on the upper bus electrode, a voltage drop due to the wiring resistance of the display device can be suppressed. In addition, the thick film electrode 22 is thick enough to absorb the pressure of each spacer 30. Thus, each thin film electron source can be prevented from being mechanically damaged by the spacer 30.

What is claimed is:

1. A cold cathode type flat panel display which is an image display device comprising a vacuum panel container composed of a cathode substrate in which plural cold cathode type electron sources are arranged at regular intervals, an anode substrate in which a phosphor film is deposited in the form of dots or lines so as to be opposed to the electron sources, plural spacers for supporting the cathode substrate and the anode substrate at a given interval, and a glass frame for keeping vacuum, plural electrical lines which extend in a line direction and a row direction which cross each other being formed, across an interlayer insulator, on the cathode substrate, the cold cathode type electron sources being arranged at positions corresponding to intersection coordinates of these electrical lines so as to be connected to the electrical lines in the line direction and the row direction, and the cold cathode type electron sources being line sequentially scanned, thereby displaying images, wherein lines positioned in an upper layer out of the plural electrical lines are made into scan lines and lines positioned in a lower layer out of the plural electrical lines are made into data lines, and some parts of the scan lines positioned in the upper layer function both as power feeding lines for giving electric potential to the spacers and scan lines, and are at scan line voltage at the least in a period when the parts of the scan lines are selected, and the cold cathode type electron sources each have a structure wherein a bottom electrode, an electron accelerator, and a top electrode are laminated in this order, and are each an electron source element which emits electrons from the surface of the top electrode when a positive voltage is applied to the top electrode, an upper surface of an upper bus electrode having a material with oxidization resistance.

2. The cold cathode type flat panel display according to claim 1, in which the bottom electrode of each of the cold cathode type electron sources is made of Al or Al alloy, and the electron accelerator is made of alumina obtained by subjecting the Al or Al alloy to anodic oxidation.

3. The cold cathode type flat panel display according to claim 1, in which in an edge portion of the cathode substrate, terminals of the electrical lines positioned in the upper layer are coupled to a scan line driver circuit, and supply electric potential to the spacer lines through the scan line driver circuit.

4. The cold cathode type flat panel display according to claim 1, in which in an edge portion of the cathode substrate, terminals of the electrical lines positioned in the upper layer are coupled to a scan line driver circuit, and supply ground voltage from the outside through independent power feeding lines in the state that the spacer lines are mutually short-circuited.

5. The cold cathode type flat panel display according to claim 1, in which the spacer lines in the edge portion of the cathode substrate are extended to the outside of terminals of the scan lines and are mutually short-circuited, and the spacer lines give ground voltage from the outside through independent power feeding lines.

6. The cold cathode type flat panel display according to claim 1, in which in an edge portion of the cathode substrate, terminals of the electrical lines positioned in the upper layer are connected to a flexible printed circuit connected to scan line driver circuit, and supply electric potential to the spacer lines through the scan line driver circuit.

7. The cold cathode type flat panel display according to claim 1, in which the upper surface of the upper bus electrode includes an Al alloy or Cr.

* * * * *